(12) United States Patent
Tanaka

(10) Patent No.: US 8,312,136 B2
(45) Date of Patent: Nov. 13, 2012

(54) COMPUTER SYSTEM MANAGEMENT BASED ON REQUEST COUNT CHANGE PARAMETER INDICATING CHANGE IN NUMBER OF REQUESTS PROCESSED BY COMPUTER SYSTEM

(75) Inventor: Atsuhiro Tanaka, Tokyo (JP)

(73) Assignee: NEC Corporation, Tokyo (JP)

(*) Notice: Subject to any disclaimer, the term of this patent is extended or adjusted under 35 U.S.C. 154(b) by 240 days.

(21) Appl. No.: 12/668,624

(22) PCT Filed: Jun. 30, 2008

(86) PCT No.: PCT/JP2008/061843
§ 371 (c)(1),
(2), (4) Date: Apr. 22, 2010

(87) PCT Pub. No.: WO2009/008279
PCT Pub. Date: Jan. 15, 2009

(65) Prior Publication Data
US 2010/0198964 A1  Aug. 5, 2010

(30) Foreign Application Priority Data
Jul. 10, 2007 (JP) .................. 2007-180843

(51) Int. Cl.
*G06F 15/173* (2006.01)
(52) U.S. Cl. ......... 709/224; 709/203; 707/613; 718/105
(58) Field of Classification Search .................. 709/200, 709/203, 224, 248; 707/600, 613; 718/105
See application file for complete search history.

(56) References Cited

U.S. PATENT DOCUMENTS

| 7,415,453 B2* | 8/2008 | Suzuki et al. ........................ 1/1 |
| 2005/0125508 A1* | 6/2005 | Smith et al. ................... 709/220 |
| 2006/0010101 A1 | 1/2006 | Suzuki et al. |
| 2006/0230016 A1* | 10/2006 | Cunningham et al. ............ 707/2 |

FOREIGN PATENT DOCUMENTS

JP  2003-157185 A  5/2003

(Continued)

OTHER PUBLICATIONS

Supplementary European Search Report for EP 08 79 0756 completed Dec. 6, 2010.
International Search Report for PCT/JP2008/061843 mailed Aug. 12, 2008.
A. Tanaka et al., "Capacity Planning for Client Server Database Systems: A Case Study", Proceedings 1995 International Workshop on Computer Performance Measurement and Analysis (Permean '95), Aug. 20-22, 1995, pp. 110-117.

(Continued)

*Primary Examiner* — Yves Dalencourt
*Assistant Examiner* — El Hadji Sall

(57) ABSTRACT

A resource usage analysis tool (23) calculates a number-of-requests variation parameter indicating the variation of the number of processed requests and a resource variation parameter indicating the usage rate and/or variation of the usage amount of the resource of the computer system from a request classification log (31) in which the number of requests processed by the computer system in each measurement period is described and system logs (32 to 34) in which the usage of the resource of the computer system in each of the measurement periods is described. An asynchronous processing detecting module (51) detects at least one occurrence of a post-processing which is a processing to be performed after the return of a response in order for the computer system to process the requests and an unexpected processing which is a processing to be performed independently of the processing of the requests but not to be performed routinely from the number-of-requests variation parameter and the resource variation parameter.

16 Claims, 18 Drawing Sheets

FOREIGN PATENT DOCUMENTS

| | | |
|---|---|---|
| JP | 2003-280931 A | 10/2003 |
| JP | 2005-316808 A | 11/2005 |
| JP | 2006-011683 A | 1/2006 |
| JP | 2006-178851 A | 7/2006 |
| JP | 2006-227999 A | 8/2006 |
| JP | 2006-301852 A | 11/2006 |

OTHER PUBLICATIONS

F. Minamoto, "Introduction to JBoss", 2003, p. 202, sec. 4.6.1.

* cited by examiner 12 (13, 14)

| i | | CPU USE RATE (%) | MEMORY USE AMOUNT (MB) | OTHER RESOURCES |
|---|---|---|---|---|
| 1 | 10:00~10:05 | 30 | 80 | |
| 2 | 10:05~10:10 | 20 | 85 | |
| 3 | 10:10~10:15 | 25 | 70 | |
| ⋮ | ⋮ | ⋮ | ⋮ | |

Fig. 6

| i | | REQUEST R1 | REQUEST R2 | ... |
|---|---|---|---|---|
| 1 | 10:00~10:05 | 20 | 10 | ... |
| 2 | 10:05~10:10 | 10 | 15 | ... |
| 3 | 10:10~10:15 | 15 | 5 | ... |
| ⋮ | ⋮ | ⋮ | ⋮ | ⋮ |

| $D_N$ | $D_\rho$ | $D_M$ | DETERMINATION |
|---|---|---|---|
| $D_N < \delta_N$ | $D_\rho \geq \delta_\rho$ | $D_M \geq \delta_M$ | BURST PROCESSING IS GENERATED |
| | | $D_M < \delta_M$ | *1 |
| | $D_\rho < \delta_\rho$ | $D_M \geq \delta_M$ | *1' |
| | | $D_M < \delta_M$ | NO ASYNCHRONOUS PROCESSING |
| $D_N \geq \delta_N$ | $D_\rho \geq \delta_\rho$ | $D_M \geq \delta_M$ | NO ASYNCHRONOUS PROCESSING |
| | | $D_M < \delta_M$ | *2' |
| | $D_\rho < \delta_\rho$ | $D_M \geq \delta_M$ | *2 |
| | | $D_M < \delta_M$ | POST PROCESSING IS GENERATED |

Fig. 8B

| $D_N$ | $D_\rho$ | $D_M$ | DETERMINATION |
|---|---|---|---|
| $|D_N| < \delta_N$ | $D_\rho \geq \delta_\rho$ | $D_M \geq \delta_M$ | BURST PROCESSING IS GENERATED |
| | | $D_M < \delta_M$ | *1 |
| | $D_\rho < \delta_\rho$ | $D_M \geq \delta_M$ | *1' |
| | | $D_M < \delta_M$ | NO ASYNCHRONOUS PROCESSING |
| $D_N \geq \delta_N$ INCREASE OF THE NUMBER OF REQUESTS | $D_\rho \geq \delta_\rho$ | $D_M \geq \delta_M$ | NO ASYNCHRONOUS PROCESSING |
| | | $D_M < \delta_M$ | * |
| | $D_\rho < \delta_\rho$ | $D_M \geq \delta_M$ | * |
| | | $D_M < \delta_M$ | * |
| $D_N \leq -\delta_N$ DECREASE OF THE NUMBER OF REQUESTS | $D_\rho \geq \delta_\rho$ | $D_M \geq \delta_M$ | * |
| | | $D_M < \delta_M$ | *2' |
| | $D_\rho < \delta_\rho$ | $D_M \geq \delta_M$ | *2 |
| | | $D_M < \delta_M$ | POST PROCESSING IS GENERATED |

Fig. 8C

| $D_N$ | $D_\rho$ | $D_M$ | DETERMINATION |
|---|---|---|---|
| $D_N \leq -\delta_N$ DECREASE OF THE NUMBER OF REQUESTS | $D_\rho \leq -\delta_\rho$ | $D_M \leq -\delta_M$ | NO ASYNCHRONOUS PROCESSING |
| | | $|D_M| < \delta_M$ | *2' |
| | | $\delta_M \leq D_M$ | * |
| | $|D_\rho| < \delta_\rho$ | $D_M \leq -\delta_M$ | *2 |
| | | $|D_M| < \delta_M$ | POST PROCESSING IS GENERATED |
| | | $\delta_M \leq D_M$ | *2 |
| | $\delta_\rho \leq D_\rho$ | $D_M \leq -\delta_M$ | * |
| | | $|D_M| < \delta_M$ | *2' |
| | | $\delta_M \leq D_M$ | * |
| $|D_N| < \delta_N$ | $D_\rho \leq -\delta_\rho$ | $D_M \leq -\delta_M$ | * |
| | | $|D_M| < \delta_M$ | * |
| | | $\delta_M \leq D_M$ | *1' |
| | $|D_\rho| < \delta_\rho$ | $D_M \leq -\delta_M$ | * |
| | | $|D_M| < \delta_M$ | NO ASYNCHRONOUS PROCESSING |
| | | $\delta_M \leq D_M$ | *1' |
| | $\delta_\rho \leq D_\rho$ | $D_M \leq -\delta_M$ | *1 |
| | | $|D_M| < \delta_M$ | *1 |
| | | $\delta_M \leq D_M$ | BURST PROCESSING IS GENERATED |
| $\delta_N \leq D_N$ INCREASE OF THE NUMBER OF REQUESTS | $D_\rho \leq -\delta_\rho$ | $D_M \leq -\delta_M$ | * |
| | | $|D_M| < \delta_M$ | * |
| | | $\delta_M \leq D_M$ | * |
| | $|D_\rho| < \delta_\rho$ | $D_M \leq -\delta_M$ | * |
| | | $|D_M| < \delta_M$ | * |
| | | $\delta_M \leq D_M$ | * |
| | $\delta_\rho \leq D_\rho$ | $D_M \leq -\delta_M$ | * |
| | | $|D_M| < \delta_M$ | * |
| | | $\delta_M \leq D_M$ | NO ASYNCHRONOUS PROCESSING |

Fig. 8D

| $D_N$ | $D_\rho$ | $D_M$ | DETERMINATION |
|---|---|---|---|
| $D_N < \delta_N$ | $D_\rho \geqq \delta_\rho$ | $D_M \geqq \delta_M$ | BURST PROCESSING IS GENERATED |
| $D_N \geqq \delta_N$ | $D_\rho < \delta_\rho$ | $D_M < \delta_M$ | POST PROCESSING IS GENERATED |

Fig. 12A

| UNIT PRICE OF CPU IN Web LAYER (YEN/5-MIN.) | |
|---|---|
| UNIT PRICE OF MEMORY IN Web LAYER (YEN/5-MIN.) | |
| UNIT PRICE OF CPU IN FUNCTION LAYER (YEN/5-MIN.) | |
| UNIT PRICE OF MEMORY IN FUNCTION LAYER (YEN/5-MIN.) | |
| UNIT PRICE OF CPU IN DATA LAYER (YEN/5-MIN.) | |
| UNIT PRICE OF MEMORY IN DATA LAYER (YEN/5-MIN.) | |

Fig. 12B

| COMPUTER SYSTEM OPERATION COST OF CPU IN Web LAYER (YEN/5-MIN.) | 1,000 |
|---|---|
| CPU CONTRIBUTION RATE IN Web LAYER (%) | 40 |
| MEMORY CONTRIBUTION RATE IN Web LAYER (%) | 60 |
| COMPUTER SYSTEM OPERATION COST OF CPU IN FUNCTION LAYER (YEN/5-MIN.) | 1,500 |
| CPU CONTRIBUTION RATE IN FUNCTION LAYER (%) | 50 |
| MEMORY CONTRIBUTION RATE IN FUNCTION LAYER (%) | 50 |
| COMPUTER SYSTEM OPERATION COST OF CPU IN DATA LAYER (YEN/5-MIN.) | 2,000 |
| CPU CONTRIBUTION RATE IN DATA LAYER (%) | 60 |
| MEMORY CONTRIBUTION RATE IN DATA LAYER (%) | 40 |

| MEASUREMENT PERIOD "i" | REQUEST R1 | REQUEST R2 | ... |
|---|---|---|---|
| USER U1 | $N_{R1U1}(i)$ | $N_{R2U1}(i)$ | ... |
| USER U2 | $N_{R1U2}(i)$ | $N_{R2U2}(i)$ | ... |
| ⋮ | ⋮ | ⋮ | ⋮ |

Fig. 14A

| i | | REQUEST R1 | REQUEST R2 | ... |
|---|---|---|---|---|
| 1 | 10:00~10:05 | $N_{R1}(1) \cdot U_{R1}^W / \Delta t$ | $N_{R2}(1) \cdot U_{R2}^W / \Delta t$ | ... |
| 2 | 10:05~10:10 | $N_{R1}(2) \cdot U_{R1}^W / \Delta t$ | $N_{R2}(2) \cdot U_{R2}^W / \Delta t$ | ... |
| 3 | 10:10~10:15 | $N_{R1}(3) \cdot U_{R1}^W / \Delta t$ | $N_{R2}(3) \cdot U_{R2}^W / \Delta t$ | ... |
| ⋮ | ⋮ | ⋮ | ⋮ | ⋮ |

| i | | REQUEST R1 | REQUEST R2 | ... |
|---|---|---|---|---|
| 1 | 10:00~10:05 | $N_{R1}(1) \cdot M_{R1}^W$ | $N_{R2}(1) \cdot M_{R2}^W$ | ... |
| 2 | 10:05~10:10 | $N_{R1}(2) \cdot M_{R1}^W$ | $N_{R2}(2) \cdot M_{R2}^W$ | ... |
| 3 | 10:10~10:15 | $N_{R1}(3) \cdot M_{R1}^W$ | $N_{R2}(3) \cdot M_{R2}^W$ | ... |
| ⋮ | ⋮ | ⋮ | ⋮ | ⋮ |

42

COMPUTER SYSTEM MANAGEMENT BASED ON REQUEST COUNT CHANGE PARAMETER INDICATING CHANGE IN NUMBER OF REQUESTS PROCESSED BY COMPUTER SYSTEM

The present application is the National Phase of PCT/JP2008/061843 filed on Jun. 30, 2008, which claims a priority on convention based on Japanese patent application No. 2007-180843 filed on Jul. 10, 2007 and the disclosure thereof is incorporated herein by reference.

TECHNICAL FIELD

The present invention relates to a computer system, and more particularly, to a technique for monitoring a computer system by monitoring processing executed by the computer system.

BACKGROUND ART

Most traditionally, when receiving a request from a user (or a server at a previous stage), a computer system performs desired processing in response to the request and returns a result of the processing to the user (or at the server of the pre-stage) as the response. Below, the processing to return a response to a request is referred to as "synchronous processing". In the computer system which performs the "synchronous processing", the system management based on a response time is effective. As for the management of the "synchronous processing", the systems management can be performed even if only the monitoring is performed over the response time.

However, in the computer system in recent years, processing is not always performed only until it returns a response after receiving a request. In the computer systems in recent years, processing except for "synchronous processing" is sometimes performed. Processing other than "Synchronous processing" (that is, processing except for processing relating to the request which is performed until returns a response after receiving a request) is referred to as "asynchronous processing".

For example, "post processing" is contained in the "asynchronous processing". The "post processing" is processing which is performed after returning a response to a user (to a server at the pre-stage) when the server processes a request. The post processing is known as a technique for response improvement when a great deal of processing efficiently performed (that is, shortening the response time). If execution of the post processing is properly scheduled, the load of a server can be balanced.

FIG. 1 is a diagram showing the "post processing" which is performed in a computer system which adopts a server network having a 3-layer structure of a Web server, an application server, and a database server. In the computer system with the configuration of FIG. 1, the Web server receives a Web request, and transmits a request to the application server, if necessary, to call the application server. When receiving the request, the application server transmits a request to the database server to call the database server, if necessary. The database server performs necessary processing in response to the received request, and returns a response. Here, the database server performs a piece of processing which is permitted to perform after a response, among pieces of processing relating to the request received from the application server, after returning the response. That is, the database server performs the "post processing". For example, an example of the "post processing" in the database server is described in "Capacity Planning for Client Server Database Systems: A Case Study" (Proceedings of the 1995 International Workshop on Computer Performance Measurement and Analysis, pp. 110 to 117) by A. Tanaka et al. In this paper, it is described that an internal operation of a database server Oracle (registered trademark) is composed of Shadow and LGW processes which return a response to a user and DBwriters executed asynchronously.

When the response is returned from the database server to the application server, the application server performs necessary processing by using the received response and returns a response to the Web server. Here, the application server performs a piece of processing that is permitted to perform after the response, among pieces of processing relating to the request received from the Web server, after returning the response. That is, the application server performs "post processing". Also, an example of the post processing performed by the application server is described in "JBoss Introduction" (Gizyutuhyouron-sya, p. 202) by H. Minamoto. In EJB (Enterprise Java (registered trademark) Bean) which is a realization example of the application server, the "post processing" is performed by using a function of a message driving type Bean, as described in the above literature.

Moreover, when a response is returned from the application server to the Web server, the Web server performs necessary processing by using the received response and returns a response to the user. Here, the Web server performs a piece of processing that is permitted to perform after the response, among pieces of the processing relating to the received Web request, after returning the response. That is, the Web server performs the "post processing".

Moreover, Japanese Patent Application Publication (JP 2003-280931A) disclosed a technique to perform processing asynchronously to an executable component, separating from an on-line transaction operation. This patent literature refers the effect of the distribution of system load by improvement in a response time and proper scheduling of execution timing.

Processing such as virus check program processing and screen saver processing, which are not performed ordinarily but are performed with no relation to request processing is listed as "asynchronous processing" except for the above-mentioned "post processing". Below, the processing which is not performed ordinarily but is performed with no relation to request processing is referred to as "burst processing". A server resource is used when the "burst processing" is performed even if any request is not received.

In the computer system that "asynchronous processing" such as "post processing" or "burst processing" is performed, it is not enough to monitor a response time. In the computer system which does not perform the "asynchronous processing", because there is strong correlation between the response time and a resource use rate, it is possible to manage the system sufficiently by monitoring only the response time. However, in the computer system which performs the "asynchronous processing", the correlation between the response time and the resource use rate is weak and the management based on the response time is not sufficient. For example, in a computer system in which "post processing" is performed, when a large amount of pieces of "post processing" are left without being performed, there is a case that the pieces of the post processing are performed suddenly. In such a case, even if the response time is monitored, the proper management of the server resources cannot be performed. In addition, because the "burst processing" is not processing to be performed in response to a request, the monitoring of the response time is not often effective.

In a case of operation management of s general server, an operation is performed to have a margin with respect to a use rate and use amount of the server resource. That is, an upper limit of the use rate and use amount of the server resource is suppressed to a value which is lower than the original ability of the computer system. For example, in a case of operation of the computer system, an upper limit of a CPU use rate is not set to 100%, and it is set to 60 to 80% to cope with an unexpected situation. The upper limit is one of important setting parameters which influence the ability of the computer system. If the upper limit is set to a lower value, the unexpected situation can be coped with but the effective utilization of the server resource cannot be achieved. Oppositely, when the upper limit is set to a higher value, the unexpected situation cannot be coped with. The upper limit is set based on the operation experience and the feeling in many years, but this method is lack for objectivity.

In order to manage a server properly in the operation, it is desirable to manage according to the existence or non-existence of "asynchronous processing". As a technique for detecting the existence or non-existence of occurrence of the "asynchronous processing", a technique for analyzing communication relation between processes operating on the computer system and judging whether processing is performed synchronously or asynchronously is known, as described in Japanese Patent Application Publication (2003-157185). In the technique, the relation between the processes is grasped by using timing charts. This technique contains problems that a measuring mechanism of the exclusive use called a software probe needs to be embedded in an operation system and it is difficult to apply it to the system in a stable operation, considering a bug. Also, a cost for collecting a great deal of event trace data is required and it is difficult to apply the technique to the system in the operating state.

DISCLOSURE OF INVENTION

Therefore, an object of the present invention is to provide a technique by which occurrence of "asynchronous processing", especially, occurrence of "post processing" or "burst processing" can be detected simply.

A computer system of the present invention is provided with a change parameter calculating section and an asynchronous process detecting section. The change parameter calculating section calculates a request count change parameter indicating a change in the number of requests processed by the computer system from a request log in which the number of requests processed in each of measurement periods is described, and calculates a resource change parameter indicating change in a use rate and/or a use amount of each of resources of the computer system from a system log in which a use state of each resource of the computer system in each measurement period. The asynchronous process detecting section detects occurrence of at least one of post processing and burst processing from the request count change parameter and the resource change parameter, wherein the post processing is processing performed after a response when the computer system processes each of the requests, and the burst processing is processing which is performed with no relation to the processing of the request but is the processing which is not performed ordinarily.

According to the present invention, the technique which can detect the occurrence of the "asynchronous processing", especially, the occurrence of the "post processing" or the "burst processing" simply can be provided.

BRIEF DESCRIPTION OF DRAWINGS

The above and other objects, the features and so on will become clear from exemplary embodiments of the present invention which will be described with the following drawings:

FIG. 6 is a diagram showing the contents of request classification log;

FIG. 8A is a diagram showing an example of the contents of a determination table;

FIG. 8B is a diagram showing another example of the contents of the determination table;

FIG. 8C is a diagram showing another example of the contents of the determination table;

FIG. 8D is a diagram showing sill another example of the contents of the determination table;

FIG. 12A is a diagram showing an example of the contents of a unit price table;

FIG. 12B is a diagram showing another example of the contents of the unit price table;

FIG. 13 is a diagram showing the contents of a user data;

FIG. 14A is a table showing the contents of a CPU output table;

FIG. 14B is a diagram showing the contents of a memory output table;

BEST MODE FOR CARRYING OUT THE INVENTION

Figure 1:
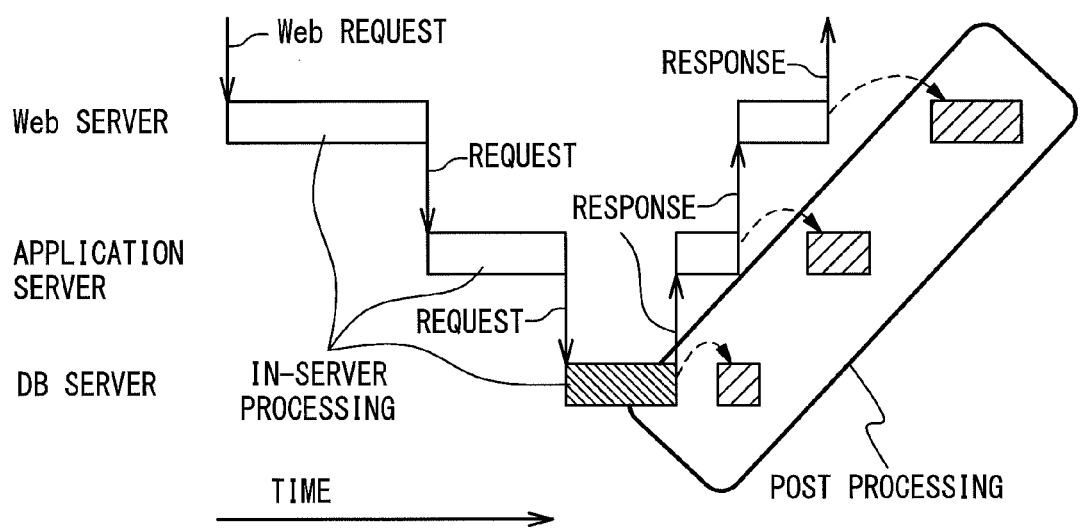
FIG. 1 is a diagram showing post processing performed by a computer system with 3-layer structure.
Figure 2:
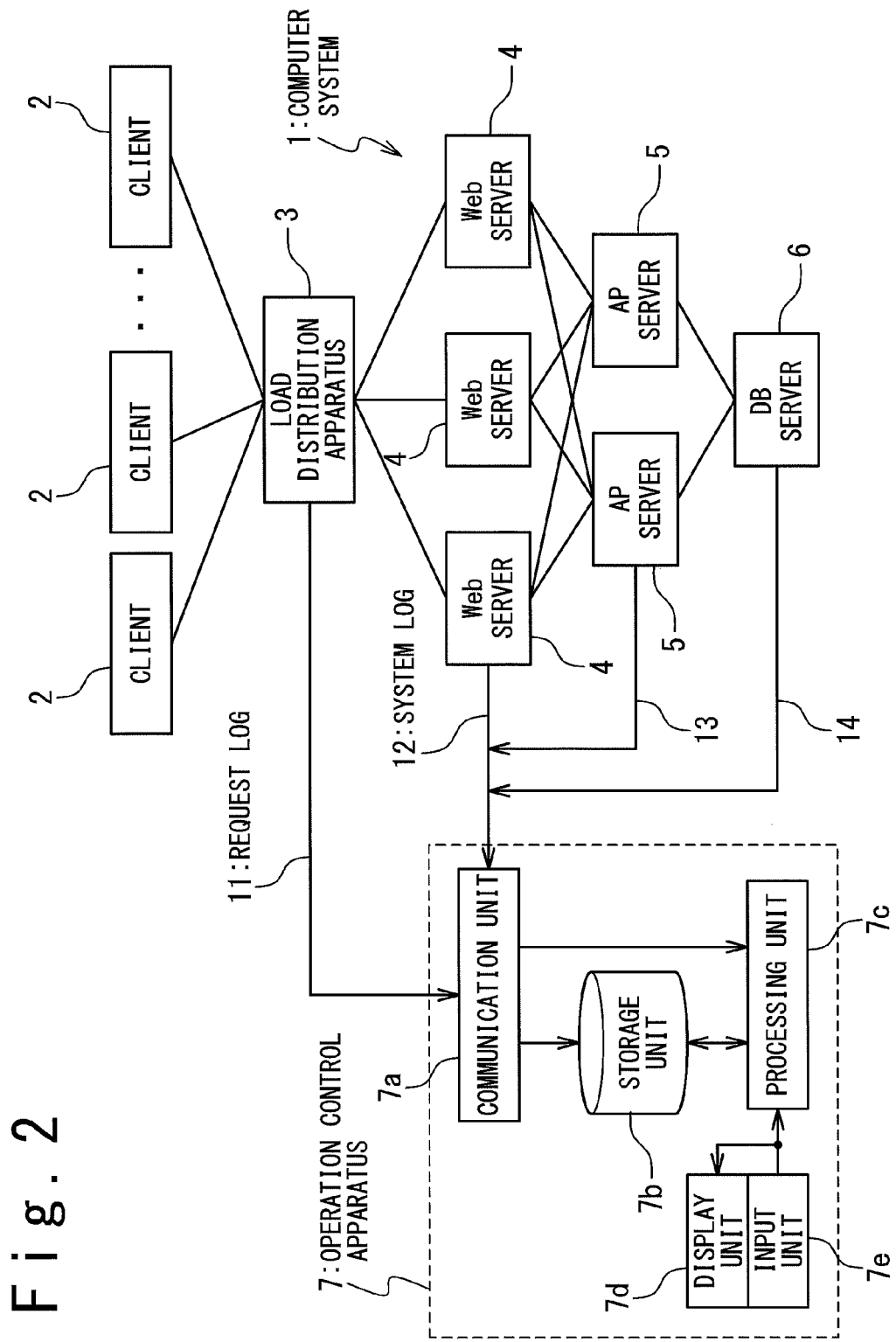
FIG. 2 is a block diagram showing a configuration of a computer system according to an exemplary embodiment of the present invention.

FIG. 2 is a block diagram showing the configuration of a computer system 1 according to an exemplary embodiment of the present invention. The computer system 1 of the present exemplary embodiment receives Web requests from clients 2 and processes each of the received Web requests. In this description, the Web request means a message defined in HTTP, and is used to refer to a file in the computer system 1 and to start a CGI (common gateway interface). The computer system 1 in the present exemplary embodiment adopts a server network of a 3-layer hierarchy. Specifically, the computer system 1 is provided with Web servers 4 of a Web layer (a presentation layer), application servers (AP servers) 5 of a function layer, and a database server (a DB server) 6 of a data layer. In the present exemplary embodiment, the Web servers 4 and the AP servers 5 are both plural, and the DB server 6 is single. However, the number of servers in each layer may be changed if necessary. Moreover, the computer system 1 may be provided with a load distribution apparatus 3. In the present exemplary embodiment, the load distribution apparatus 3 is provided in a hardware unit different from the server network. On the other hand, a case that the load distribution apparatus 3 and the server network are provided in a same hardware unit.

The load distribution apparatus 3 receives Web requests transmitted from the clients 2 and distributes the Web requests to the Web server 4 using a suitable load distribution algorithm. The Web server 4 processes the received Web request and returns a processing result to the client 2 as a response. The Web server 4 uses functions of the AP server 5, if necessary. In this case, the Web server 4 generates an AP request for the AP server 5 to execute desired processes. The AP server 5 executes a business logic process in response to the AP request transmitted from the Web server 4 and returns a processing result to the Web server 4 as a response in a format used in WWW (for example, an HTML format or an XML format). The AP server 5 transmits a request to a database server 6 if is necessary, and accesses to the database server 6. The database server 6 is provided with a database and performs search and update of the database in response to the request transmitted from the AP server 5. The database server 6 returns a search result of the database and a notice of update completion to the AP server 5 as a response.

In order to manage the computer system 1, an operation control apparatus 7 is provided in the computer system 1. In the present exemplary embodiment, a computer apparatus having a communication unit 7a, a storage unit 7b, a processing unit 7c, a display unit 7d and an input unit 7e is used as the operation control apparatus 7. Various software programs to manage the computer system 1 are installed in the operation control apparatus 7. Various logs, specifically, a request log 11 transmitted from the load distribution apparatus 3, and a system log transmitted from each of the Web servers 4, the application servers 5 and the database server 6 are used for the control of the computer system 1. In FIG. 2, the system logs transmitted from the Web servers 4 are assigned with reference numeral 12, the system logs transmitted from the AP server 5 are assigned with reference numeral 13 and the system logs transmitted from the DB server 6 are assigned with reference numeral 14. In the present exemplary embodiment, the operation control apparatus 7 is provided in a hardware unit different from the load distribution apparatus 3. On the other hand, a case that the operation control apparatus 7 and the load distribution apparatus 3 are provided in the same hardware unit. Also, a case that the operation control apparatus 7 is provided in the computer system 1 and a case that it is provided out of the computer system 1 are considered.

The request log 11 contains a record of a Web request which has arrived at the computer system 1, and a kind of the Web request and the time that the Web request has been processed are described. In the present exemplary embodiment, the Web requests are classified into various kinds based on methods described in them. For example, there are a GET request which contains a GET method, a PUT request which contains a PUT method, a POST request which contains a POST method, and a DELETE request which contains a DELETE method as the Web requests.

Figure 3:
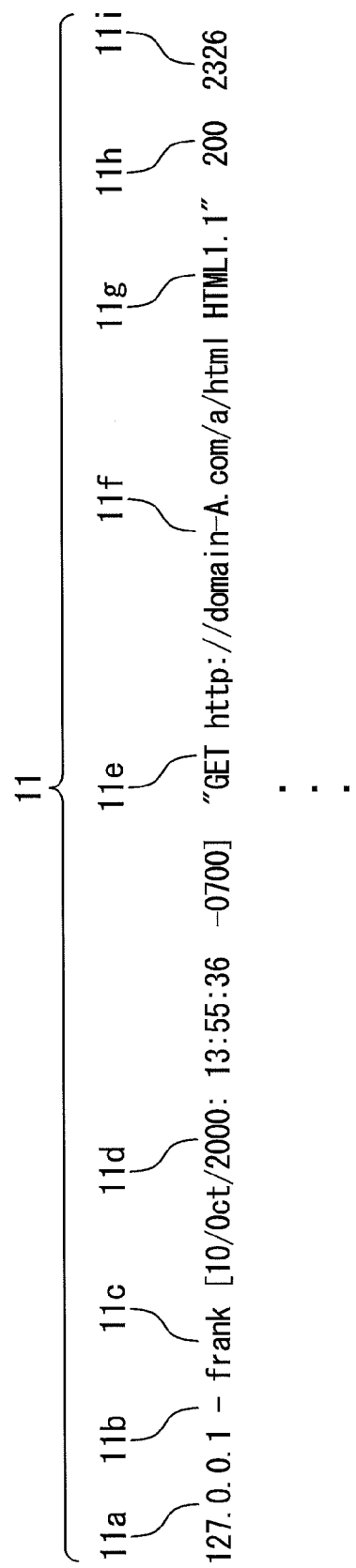
FIG. 3 is a diagram showing the contents of request log.

FIG. 3 is a diagram showing the contents of the request log 11 in the present exemplary embodiment. Only a part of the request log 11 corresponding to a Web request is illustrated in FIG. 3. In the present exemplary embodiment, the following information is written in the request log 11: an IP addresses 11a of the client 2 which has issued the Web request, an identity 11b of the client 2 (defined in RFC 1413), and a user ID 11c of the client 2 which has issued the Web request are described in the request log 11. In the request log 11 of FIG. 3, the identity 11b is described as "-" (hyphen) but this shows that information of the identity 11b of the client 2 could not be obtained. The user ID 11c is assigned to a user when the HTTP authentication is successful, and is shown by "-" (hyphen) when the authentication fails.

Moreover, time 11d at which the Web request was processed, a kind 11e of the Web request (i.e. a method described in the Web request), a URL (uniform resource locator) 11f of a document to be referred in response to the Web request, and a version number 11g of the HTTP protocol are described in the request log 11. The time 11d at which the Web request was processed may be defined as time at which the processing of the Web request was ended, and may be defined as time at which the Web request arrived. In an example of FIG. 3, the kind of the Web request is a GET request, and the version number of the used HTTP protocol is 1.1. In addition, a status code 11h indicating whether the processing of the Web request is success or failed, a processing result of the Web request, and the number of bytes 11i of the data to be transmitted back to the client 2 (other than a header) are described in the request log 11.

In the present exemplary embodiment, the request log 11 transmitted from the load distribution apparatus 3 is used for the management of the computer system 1. However, instead, the request log transmitted from each of the Web servers 4 may be used.

Figure 4:
FIG. 4 is a table showing the contents of system log.

On the other hand, the system logs 12, 13, and 14 are respectively records which describe the resource use states of the Web server 4, the application server 5 and the database server 6 for every measurement period. In the exemplary embodiment, each measurement period is defined as a predetermined time period (e.g. 5 minutes). However, the length of the measurement period may be variable. FIG. 4 is a table showing the contents of the system log 12. In the present exemplary embodiment, a CPU use rate and a memory use amount in the corresponding Web server 4 are described in the system log 12 in the interval of 5 minutes. That is, the CPU use rate and the memory use amount in the corresponding Web server 4 are described in the system log 12 for every measurement period of 5 minutes. The system logs 13 and 14, too, have similar contents. The CPU use rate and a memory use amount of the corresponding AP server 5 are described in the system log 13 in the interval of 5 minutes, and the CPU use rate and a memory use amount of the DB server 6 are described in the system log 14 in the interval of 5 minutes.

The function to generate the system log of such contents is usually provided in a general operating system such as Windows (registered trademark of Microsoft) and UNIX (registered trademark of The Open Group). To use the function of the operating system is effective to reduce an installation cost without providing a special mechanism for generating the system log, in the operating system, the Web server 4, the AP server 5, and the DB server 6.

The operation control apparatus 7 manages and controls the computer system 1 by using the above-mentioned request log 11 and the system logs 12, 13, and 14. One feature of the operation control apparatus 7 in the present exemplary embodiment is in that the operation control apparatus 7 can detect an occurrence of "asynchronous processing", i.e. an occurrence of "post processing" or "burst processing", from the request log 11 and the system logs 12, 13, and 14. In detail, the operation control apparatus 7 detects a change of the number of Web requests from the request log 11, and further detects changes in a use rate and a use amount of resources of each server, specifically, the changes in a CPU use rate and a memory use amount, from the system logs 12, 13 and 14. The changes in the CPU use rate and the memory use amount in the Web server 4 are detected from the system log 12, the changes in the CPU use rate and the memory use amount in the AP server 5 are detected from the system log 13, and the changes in the CPU use rate and the memory use amount in the DB server 6 are detected from the system log 14. Moreover, the operation control apparatus 7 detects the occurrence of the "post processing" or the "burst processing" in each of the Web servers 4, the AP servers 5, and the DB server 6 from coincidence/non-coincidence of the change in the detected number of Web requests and the changes in the CPU use rate and the memory use amount. Hereinafter, an operation of the operation control apparatus 7 will be is described in detail.

Figure 5:
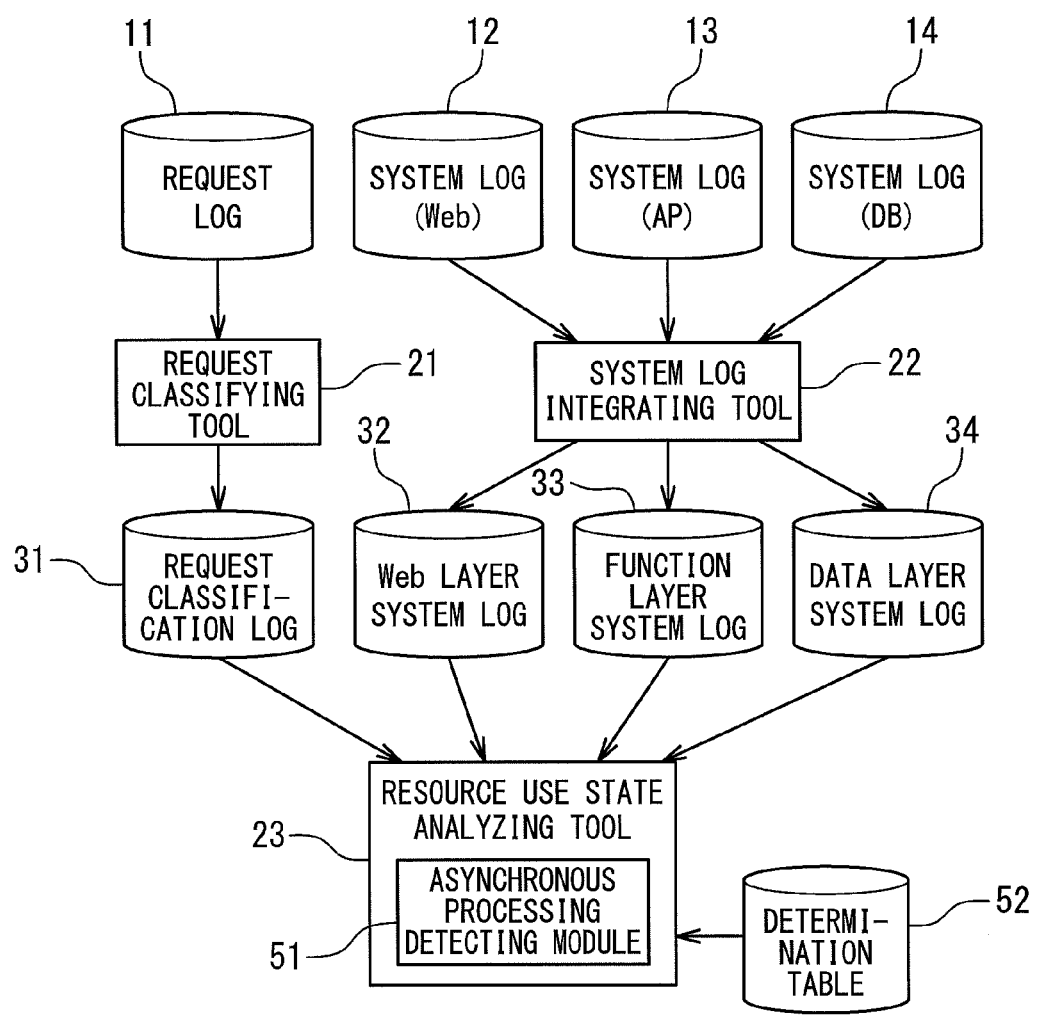
FIG. 5 is a block diagram showing a software configuration of an operation control apparatus.

FIG. 5 is a block diagram showing an example of the software configuration of the operation control apparatus 7. A Request classifying tool 21, a system log integrating tool 22 and a resource use state analyzing tool 23 are installed in the storage unit 7b of the operation control apparatus 7. The operation and management of the computer system 1 are carried out by use of these software programs.

The operation of the operation control apparatus 7 will be described below in detail. The request classifying tool 21 of the operation control apparatus 7 is a program to analyze the request log 11 transmitted from the load distribution apparatus 3 and calculate the number of Web requests which were processed by the computer system 1 within each measurement period for every kind of Web request. A calculation result is stored in the storage unit 7b as the request classification log 31.

FIG. 6 is a table showing the contents of request classification log 31. In the present exemplary embodiment, the request classification log 31 shows the number of Web requests which were processed within each measurement period for every kind of Web request. In an example of FIG. 6, it is shown by the request classification log 31 that the Web request of the kind "R1" (e.g. GET request) is processed 20 times in the measurement period of 10:00-10:05, that the Web request of the kind "R2" (e.g. POST request) is processed 10 times. In the present exemplary embodiment, the request classification log 31 has been described under the assumption of all the measurement periods to be 5 minutes but the measurement period is not always constant.

On the other hand, the system log integrating tool 22 is a program to generate a Web layer system log 32, a function layer system log 33, and a data layer system log 34 from the system logs 12, 13 and 14 transmitted from the Web server 4, the AP servers 5 and the DB servers 6. The Web layer system log 32 is a record to show that the resource use state in the whole Web layer for every measurement period. The system log integrating tool 22 generates the Web layer system log 32 by integrating the system log 12 received from each of the Web servers 4. In the present exemplary embodiment, the system log integrating tool 22 calculates a CPU use rate for the whole Web layer by averaging the CPU use rates of the Web servers 4, and calculates a memory use amount for the whole Web layer by adding the memory use amounts of the Web servers 4. The calculated CPU use rate and memory use amount are described in the Web layer system log 32. In the same way, the function layer system log 33 and the data layer system log 34 are respectively records which describe resource use states in the whole function layer and data layer for every measurement period. In the present exemplary embodiment, since the data layer includes a single DB server 6, the system log 14 of the DB server 6 may be used as the data layer system log 34.

The resource use state analyzing tool 23 is a program to analyze the resource use state in each of the request classification log 31, the Web layer system log 32, the function layer system log 33, the data layer system log 34, and the computer system 1. The resource use state analyzing tool 23 contains an asynchronous processing detecting module 51 which detects an occurrence of "asynchronous processing", specifically, an occurrence of "post processing" or "burst processing". The asynchronous processing detecting module 51 is a software program to detect the occurrence of the "post processing" or the "burst processing" by using the determination table 52 stored in the storage unit 7b. A procedure by which the asynchronous processing detecting module 51 detects the occurrence of the "post processing" and the "burst processing" in each of the Web layer, the function layer, and the data layer will be described below in detail.

The following measurement data acquired in the measurement period "i" (i=1 to m) are used for the detection of occurrence of the "post processing" or the "burst processing":
(a) The number of Web requests for each of kinds R1 to Rn in the measurement periods "1" to "m" is $N_{R1}(1)$ to $N_{R1}(m)$, $N_{R2}(1)$ to $N_{R2}(m)$, ..., and $N_{Rn}(1)$ to $N_{Rn}(m)$;
(b) The CPU use rates in the Web layer, the function layer, and the data layer for the measurement periods "1" to "m" is $\rho^W(1)$ to $\rho^W(m)$, $\rho^F(1)$ to $\rho^F(m)$, and $\rho^D(1)$ to $\rho^D(m)$; and
(c) The memory use amount of the Web layer, the function layer, and the data layer in the measurement periods "1" to "m" is $M^W(1)$ to $M^W(m)$, $M^F(1)$ to $M^F(m)$, and $M^D(1)$ to $M^D(m)$.

It should be noted that "W" is a subscript showing the Web layer, that "F" is a subscript showing the function layer and that "D" is the subscript showing a data layer.

The basic concept of detection of the occurrence of the "post processing" or the "burst processing" is as follows: The asynchronous processing detecting module 51 determines that the "post processing" occurs in the specific layer in the measurement period "t", regardless that when the change in the number of Web requests is large in the specific measurement period "t" (especially, when the number of Web requests decreases largely) in spite of the change in the CPU use rate and the memory use rate in the specific layer (e.g. the Web layer) are small, it is determined that the post processing has occurred in the measurement period "t" in the specific layer. Such a determination technique is based on the idea that the "post processing" appears as the phenomenon that the load of each server does not change (that is, do not decrease) while the Web requests decrease.

On the other hand, when the change in the number of Web requests is small but when the change in the CPU use rate and the memory use rate in the specific layer (e.g. the Web layer) is large in the specific measurement period "t" (especially, when the CPU use rate and the memory use rate increase largely), it is determined that the "burst processing" occurs in the specific layer in the measurement period "t". Such a determination technique is based on the idea that the "burst processing" appears as the phenomenon that the CPU use rate and the memory use rate increase largely with no relation to the Web requests.

The detection algorithm of occurrence of the "post processing" or the "burst processing" will be described in detail. The occurrence of the "post processing" or the "burst pro cessing" in the Web layer is taken up as an example. The used data are as follows:

(a) The number of Web requests of kinds R1 to Rn in the measurement periods "1" to "m": $N_{R1}(1)$ to $N_{R1}(m)$, $N_{R2}(1)$ to $N_{R2}(m)$, ... $N_{Rn}(1)$ to $N_{Rn}(m)$; and (b) The CPU use rate $\rho^W(1)$ to $\rho^W(m)$ and the memory use amount $M^W(1)$ to $M^W(m)$ in the Web layer in the measurement periods "1" to "m". Below, the description is given while the subscript "W" is omitted.

In the detection algorithm, $N_1$ to $N_n$, $\rho$ and M are used as internal variables. These internal variables are used to preserve a moving average of the latest measurement data. In the case of the detection of occurrence of the "post processing" or the "burst processing" in the measurement period "t", an average of k (k is an integer equal to or more than 2) measurement data in the measurement periods "t−k" to "t−1" is calculated as the moving average and is stored in these internal variables. That is, $N_j$ is the internal variable which preserves an average of the numbers of Web requests $N_{Rj}(t−k)$ to $N_{Rj}(t−1)$ of the kind Rj, and $\rho$ is the internal variable which preserves an average of the CPU use rates $\rho(t−k)$ to $\rho(t−1)$.

The weighted moving average may be calculated and stored in the internal variables N1 to Nn, $\rho$ and M. In this case, the weight coefficients $a_1$ to $a_k$ used for the calculation of the weighted moving average may be provided in the storage unit 7b of the operation control apparatus 7 in advance and may be supplied to the operation control apparatus 7 by a user.

Figure 7:
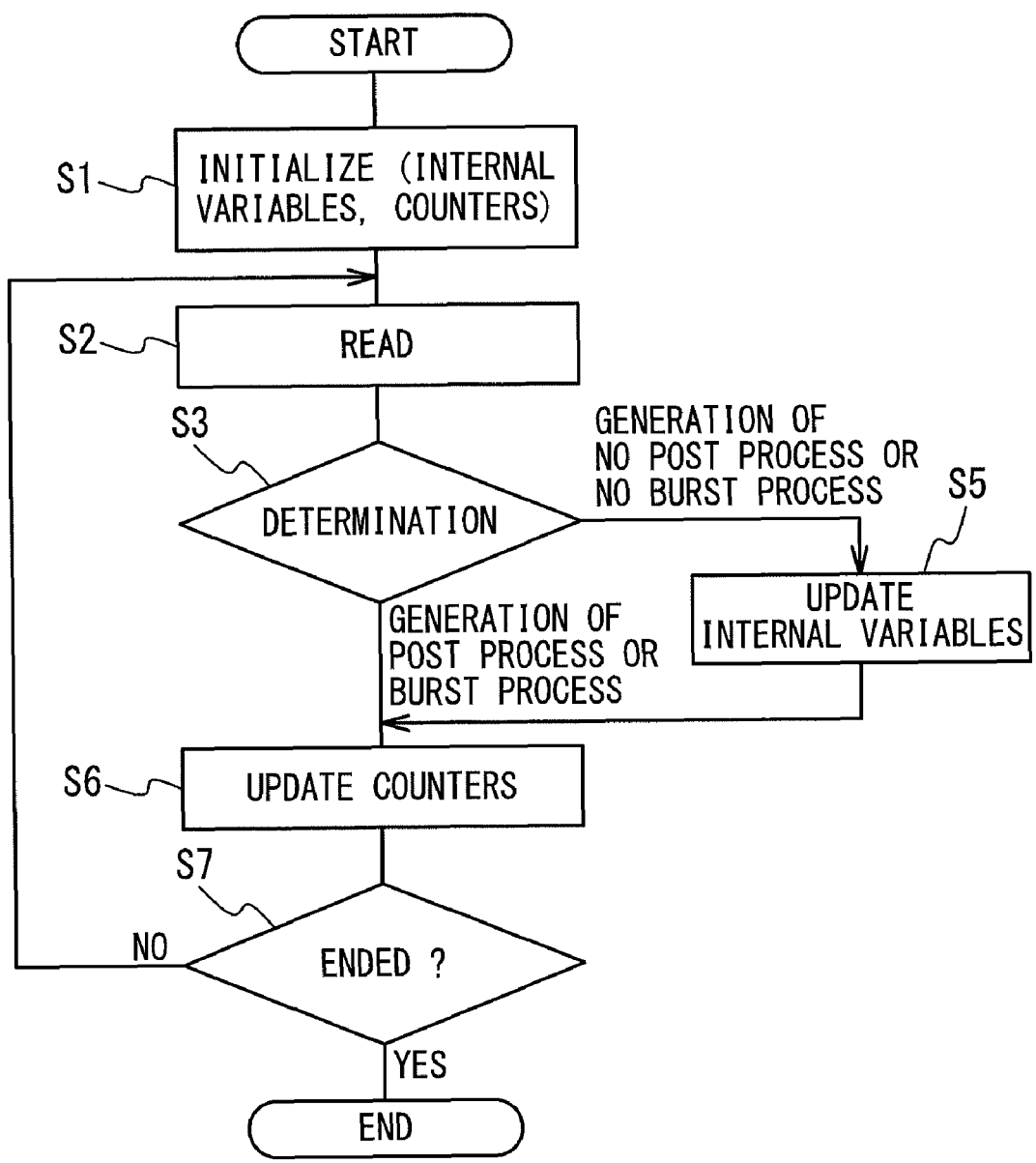
FIG. 7 is a flow chart showing a detection algorithm of occurrence of "post processing" or "burst processing"

FIG. 7 is a flow chart showing the details of the detection algorithm of occurrence of the "post processing" or the "burst processing" in the measurement periods "k+1" to "m". Hereinafter, each step will be described.

Step S1:

At step S1, initialization is performed. First, a counter t is set to t=k+1. Subsequently, the occurrence or non-occurrence of the "post processing" or the "burst processing" in the measurement period "k+1" is judged. Moreover, the internal variables $N_1$ to $N_n$, $\rho$ and M are set as follows:

(a) When weighting is not performed, $$N_j = \{N_{Rj}(t-k) + N_{Rj}(t-k+1) + \ldots + N_{Rj}(t-1)\}/k \quad (21a)$$
$$= \{N_{Rj}(1) + N_{Rj}(2) + \ldots + N_{Rj}(k)\}/k$$
$$(j = 1 \text{ to } n)$$

$$\rho = \{\rho(t-k) + \rho(t-k+1) + \ldots + \rho(t-1)\}/k \quad (21b)$$
$$= \{\rho(1) + \rho(2) + \ldots + \rho(k)\}/k$$

$$M = \{M(t-k) + M(t-k+1) + \ldots + M(t-1)\}/k \quad (21c)$$
$$= \{M(1) + M(2) + \ldots + M(k)\}/k$$

(b) When weighting is performed, $$N_j = \{a_k N_{Rj}(t-k) + a_{k-1} N_{Rj}(t-k+1) + \ldots + a_1 N_{Rj}(t-1)\}/ \quad (21a')$$
$$(a_1 + a_2 + \ldots + a_k)$$
$$= \{a_k N_{Rj}(1) + a_{k-1} N_{Rj}(2) + \ldots + a_1 N_{Rj}(k)\}/$$
$$(a_1 + a_2 + \ldots + a_k)$$
$$(j = 1 \text{ to } n)$$

$$\rho = \{a_k \rho(t-k) + a_{k-1} \rho(t-k+1) + \ldots + a_1 \rho(t-1)\}/ \quad (21b')$$
$$(a_1 + a_2 + \ldots + a_k)$$
$$= \{a_k \rho(1) + a_{k-1} \rho(2) + \ldots + a_1 \rho(k)\}/(a_1 + a_2 + \ldots + a_k)$$

-continued
$$M = \{a_k M(t-k) + a_{k-1} M(t-k+1) + \ldots + a_1 M(t-1)\}/ \quad (21c')$$
$$(a_1 + a_2 + \ldots + a_k)$$
$$= \{a_k M(1) + a_{k-1} M(2) + \ldots + a_1 M(k)\}/$$
$$(a_1 + a_2 + \ldots + a_k)$$

The weighting is performed to enhance a part of measurement data in the judgment of the existence or non-existence of change of the measurement data. If the recent measurement data are more important, the weight coefficients $a_1$ to $a_k$ are determined such that the weights are set to meet the following relation:

$$a_1 > a_2 > \ldots > a_k$$

As shown in FIG. 7, after the initialization (i.e. after the setting of the counter t and the internal variables), the control flow advances to step S2.

Step S2:

At step S2, the measurement data $N_{R1}(t)$ to $N_{Rn}(t)$, $\rho(t)$, and M(t) in the measurement period "t" are read. After the read of the measurement data, the control flow advances to step S3.

Step S3:

At step S3, the judgment of occurrence of the "post processing" or the "burst processing" in the measurement period "t" is performed by using the internal variables N1 to Nn, $\rho$ and M. More specifically, variable parameters $D_N$, $D_\rho$, and $D_M$ are first calculated. Here, the variable parameter $D_N$ is a parameter showing a change in the number of Web requests. The variable parameter $D_\rho$ is a parameter showing a change of the CPU use rate (in the Web layer). The variable parameter $D_M$ is a parameter showing a change of the memory use amount (in the Web layer). The occurrence of the "post processing" or the "burst processing" is detected from the relation between the variable parameters $D_N$, $D_\rho$, and $D_M$, and the set values $\delta_N$, $\delta_\rho$, and $\delta_M$.

In the present exemplary embodiment, the variable parameters $D_N$, $D_\rho$, $D_M$ are calculated from the following equation:

$$D_N = (\Sigma |N_{Rj}(t) - N_j|^2)^{1/2} \quad (22a)$$

$$D_\rho = (|\rho(t) - \rho|^2)^{1/2} \quad (22b)$$

$$D_M = (|M(t) - M|^2)^{1/2} \quad (22c)$$

Here, $\Sigma$ shows a summation for j=1 to n.

The magnitude of change in the number of Web requests is judged through comparison between the variable parameter $D_N$ and the set value $\delta_N$. If the variable parameter $D_N$ is larger than the set value $\delta_N$, the number of Web requests is judged to have changed in the measurement period "t". The change of the number of Web requests is judged to be small, if not. In the same way, if the variable parameter $D_\rho$ is larger than the set value $\delta_\rho$, the CPU use rate is judged to have changed in the measurement period "t". The change of the CPU use rate is judged to be small, if not. Moreover, if the variable parameter $D_M$ is larger than the set value $\delta_M$, the memory use amount is judged to have changed in the measurement period "t". The change of the memory use amount is judged to be small, if not.

A determination table 52 shows a relation between a combination of the relations between the variable parameters $D_N$, $D_\rho$, and $D_M$, and the set values $\delta_N$, $\delta_\rho$, and $\delta_M$, and the occurrence of the "post processing" or the "burst processing". The occurrence of the "Post processing" or the "burst processing" is judged based on the combination of the relations between the variable parameters $D_N$, $D_\rho$, and $D_M$, and the set values $\delta_N$, $\delta_\rho$, and $\delta_M$ while referring to the determination table 52. FIG. 8A is a table showing an example of the contents of the determination table 52. In the present exemplary embodiment, when the variable parameter $D_N$ is above the set value $\delta_N$ (or it is larger than the set value $\delta_N$), the variable parameter $D_\rho$ is below the set value $\delta_\rho$ (or it is equal to or smaller than the set value $\delta_\rho$), and the variable parameter $D_M$ is under the set value $\delta_M$ (or it is equal to or smaller than the set value $\delta_M$), it is judged that the "post processing" has occurred in the measurement period "t". Also, the variable parameter $D_N$ is under the set value $\delta_N$ (or it is equal to or smaller than the set value $\delta_N$), the variable parameter $D_\rho$ is above the set value $\delta_\rho$ (or it is larger than the set value $\delta_\rho$), and the variable parameter $D_M$ is above the set value $\delta_M$ (or it is larger than the set value $\delta_M$), it is judged that the "burst processing" has occurred in the measurement period "t".

Also, when the change in the number of Web requests corresponds to the changes in both of the CPU use rate and the memory use amount, "asynchronous processing" such as the "post processing" and the "burst processing" is judged not to occur. That is, when the variable parameters $D_N$, $D_\rho$, and $D_M$ are respectively under the set values $\delta_N$, $\delta_\rho$, and $\delta_M$ (or equal to or lower than the set values $\delta_N$, $\delta_\rho$, and $\delta_M$), or when the variable parameters $D_N$, $D_\rho$, and $D_M$ are respectively above the set values $\delta_N$, $\delta_\rho$ and $\delta_M$ (or are larger than the set values $\delta_N$, $\delta_\rho$, and $\delta_M$), the "asynchronous processing" is judged not to occur.

In either of the above-mentioned judging technique, when the change in the number of Web requests corresponds to one of the changes in the CPU use rate and the memory use amount and does not corresponds to the other (in the case of "*1", "*1'", "*2", "*2'" in FIG. 8A), the existence or non-existence of occurrence of the asynchronous processing cannot be strictly decided. However, even if it is judged that the asynchronous processing does not occur, there is not a problem, because such a situation does not occur generally. Also, if there is in advance a knowledge that a CPU is used but a memory is not used so much to process the Web request, the column of the variable parameter $D_M$ may be excluded from the determination table 52, and the "burst processing" may be judged to have occurred in the case of "*1" in FIG. 8A, and the "post processing" may be judged to have occurred in the case of "*2" in FIG. 8A. Oppositely, when the Web request uses the memory but does not use the CPU, the column of the variable parameter $D_\rho$ is excluded from the determination table 52, and the "burst processing" may be judged to have occurred in the case of "*1'" in FIG. 8A, and the "post processing" may be judged to have occurred in the case of "*2'" in FIG. 8A.

In the above-mentioned judgment technique, it is possible to know the changes in the number of Web requests, the CPU use rate, and the memory use rate, but it is not possible to determine whether or not they actually increase or decrease. The occurrence of the "post processing" appears when the CPU use rate and the memory use rate do not decrease so much even if the number of Web requests decreases. On the other hand, the phenomenon appears that increase in the number of Web requests directly causes immediate increase in the CPU use rate and memory use rate. Therefore, if considering these phenomena, it is desirable that the increase or decrease is determined with respect to the change in the number of Web requests.

If considering the increase or decrease in the number of Web requests, the variable parameter $D_N$ is calculated from the following equation:

$$D_N = \Sigma(N_{Rj}(t) - N_j) \quad (22a')$$

It should be noted that the variable parameter $D_N$ is defined as a summation of the differences between the number $N_{Rj}(t)$ of Web requests in the measurement period "t" and the moving average $N_j$ in the equation (2a'). The variable parameter $D_\rho$ and $D_M$ are defined in the above equations (22b) and (22c).

FIG. 8B is a table showing an example of the contents of the determination table 52 when the variable parameter $D_N$ is calculated from the equation (22a'). In the present exemplary embodiment, when the variable parameter $D_N$ is under the set value $-\delta_N$ (or it is smaller than the set value $-\delta_N$), the variable parameter $D_\rho$ is under the set value $\delta_\rho$ (or it is equal to or smaller than the set value $\delta_\rho$), and the variable parameter $D_M$ is under the set value $\delta_M$ (or it is equal to or smaller than the set value $\delta_M$), the "post processing" is judged to have occurred in the measurement period "t". Also, when the absolute value $|D_N|$ of the variable parameter $D_N$ is below the set value $\delta_N$ (or it is equal to or smaller than the set value $\delta_N$), the variable parameter $D_\rho$ is above the set value $\delta_\rho$ (or it is larger than the set value $\delta_\rho$), and the variable parameter $D_M$ is above the set value $\delta_M$ (or it is larger than the set value $\delta_M$), the "burst processing" is judged to have occurred in the measurement period "t".

In addition to the number of Web requests, the increase or decrease may be determined with respect to each of the CPU use rate and the memory use amount. In this case, the variable parameters $D_\rho$ and $D_M$ are calculated by the following equations:

$$D_\rho = \Sigma(\rho(t) - \rho) \quad (22b')$$

$$D_M = \Sigma(M(t) - M) \quad (22c')$$

The variable parameter $D_N$ is calculated from the above-mentioned equation (2a').

FIG. 8C is a table showing an example of the contents of the determination table 52 when the variable parameters $D_N$, $D_\rho$, and $D_M$ are calculated by use of the equations (22a') to (22c'). In the present exemplary embodiment, the variable parameter $D_N$ is under the set value $-\delta_N$ (or it is equal to or smaller than the set value $-\delta_N$), the absolute value $|D_\rho|$ of the variable parameter $D_\rho$ is under the set value $\delta_\rho$ (or it is equal to or smaller than the set value $\delta_\rho$), and the absolute value $|D_M|$ of the variable parameter $D_M$ is under the set value $\delta_M$ (or it is equal to or smaller than the set value $\delta_M$), the "post processing" is judged to have occurred in the measurement period "t". On the other hand, the absolute value $|D_N|$ of the variable parameter $D_N$ is under the set value $\delta_N$ (or it is equal to or smaller than the set value $\delta_N$), the variable parameter $D_\rho$ is above the set value $\delta_\rho$ (or it is larger than the set value $\delta\rho$), and the variable parameter $D_M$ is above the set value $\delta_M$ (or it is larger than the set value $\delta_M$), the "burst processing" is judged to have occurred in the measurement period "t".

In a case of considering increase or decrease in the number of Web requests (that is, in the case of use of the determination table 52 of the contents shown in FIGS. 8B and 8C), when the change in the number of Web requests corresponds to one of the changes in the CPU use rate and the memory use amount and does not corresponds to the other (i.e. in the case of the symbols "*", "*1", "*1'", "*2", "*2'" in FIGS. 8A to 8D), the existence or non-existence of the occurrence of the asynchronous processing cannot be strictly determined. However, there is not a problem even if it is judged that the asynchronous processing does not occur, because such a situation does not occur usually. However, when knowledge is obtained in advance that a CPU is used mainly and the memory is not used so much, in order to process the Web request, the column of the variable parameter $D_M$ may be excluded from the determination table 52, and the "burst processing" may be judged to have occurred in the case of "*1" of FIG. 8A, and the "post processing" may be judged to have occurred in the case of "*2" of FIG. 8A. Oppositely, when the memory is used but the CPU is not used so much in order to process the Web request, the column of the variable parameter $D_\rho$ may be excluded from the determination table 52, and the "burst processing" may be judged to have occurred in the case of "*1'" of FIG. 8A, and the "post processing" may be judged to have occurred in the case of "*2'" of FIG. 8A.

In should be noted that the determination table 52 does not have to contain judgments in all cases, unlike FIGS. 8A to 8C. It is sufficient that only the conditions of the occurrence of the "burst processing" or the "post processing" to be detected are described in the determination table 52 at a minimum, as shown in FIG. 8D.

As shown in FIG. 7, when the occurrence of the "post processing" or the "burst processing" is not detected at step S3, the control flow advances to step S5 and when the occurrence of the "post processing" or the "burst processing" is detected, the control flow advances to step S6.

Step S5:

When the occurrence of the "post processing" or the "burst processing" is not detected, the internal variables are updated as follows:

(a) When weighting is not performed, $$N_j = \{N_{Rj}(t-k+1) + N_{Rj}(t-k+2) + \ldots + N_{Rj}(t)\}/k (j=1 \text{ to } n) \quad (23a)$$

$$\rho = \{\rho(t-k+1) + \rho(t-k+2) + \ldots + \rho(t)\}/k \quad (23b)$$

$$M = \{M(t-k+1) + M(t-k+2) + \ldots + M(t)\}/k \quad (23c)$$

(b) When weighting is performed, $$N_j = \{a_k N_{Rj}(t-k+1) + a_{k-1} N_{Rj}(t-k+2) + \ldots + a_1 N_{Rj}(t)\}/(a_1 + a_2 + \ldots + a_k)(j=1 \text{ to } n) \quad (23a')$$

$$\rho = \{a_k \rho(t-k+1) + a_{k-1} \rho(t-k+2) + \ldots + a_1 \rho(t)\}/(a_1 + a_2 + \ldots + a_k) \quad (23b')$$

$$M = \{a_k M(t-k+1) + a_{k-1} M(t-k+2) + \ldots + a_1 M(t)\}/(a_1 + a_2 + \ldots + a_k) \quad (23c')$$

It should be noted that when the occurrence of the "post processing" or the "burst processing" is detected, the update of the internal variables is not performed. The measurement data obtained in the measurement period, during which the "post processing" or the "burst processing" has occurred, are not used for the calculation of the moving average. After update of the internal variables, the control flow advances to step S6.

Step S6:

At step S6, the value of counter t is increased by one. After the update of counter t, the control flow advances to step S7.

Step S7:

At step S7, whether or not the control flow is to be continued is judged. When the value of the counter t is below the number m of the measurement data, the control flow advances to the step S2 and the same process as described above is repeated. When the value of the counter t exceeds the number m of the measurement data, the control flow is ended. The occurrence of the "asynchronous processing", especially, the "post processing" or the "burst processing" in each the measurement period is detected by such algorithm.

It should be noted that in the present exemplary embodiment, both of the "post processing" and the "burst processing" are detected but only one of the "post processing" and the "burst processing" may be detected. Also, in the present exemplary embodiment, although "an post processing" and the "burst processing" are detected from both of the CPU use rate and the memory use amount, the "post processing" and/or the "burst processing" may be detected only from one of the CPU use rate and the memory use amount. Moreover, although the "post processing" and/or the "burst processing" are detected by using the change of the number of Web requests in the present exemplary embodiment, the number of requests received and processed by the AP server 5 in the function layer and processed and the number of requests received and processed by the DB server 6 in the data layer may be used instead of the number of Web requests processed by the computer system 1 in the detection of the "post processing" and/or the "burst processing" in the function layer and the data layer.

One application example of the detection result of occurrence of the "post processing" or the "burst processing" is to increase the efficiency of the operation management of the servers. In the computer system in which the "post processing" or the "burst processing" does not almost occur, all of most of the server resources are spent on the request processing. Therefore, in such a computer system, upper limits of a use rate and a use amount of the server resource (e.g. the CPU use rate and the memory use amount) are set to higher values to improve the operation efficiency of the server resources. On the other hand, in the computer system in which the "post processing" and the "burst processing" are performed in many times, when setting the upper limits of the use rate and the use amount of the server resources to higher values to improve the operation efficiency of server resources, there is the possibility that the use rate and the use amount of the server resources exceed the set upper limits because of the "post processing" or the "burst processing", resulting in causing rapid elongation of the response time. Therefore, it is desirable to set the upper limits to lower values for the stable operation rather than the improvement of the operation efficiency of the server resources, in the computer system that the "post processing" or the "burst processing" often occurs. More specifically, a software program to set the upper limits of the use rate and the use amount of the server resources of each of the Web servers 4, the application servers 5 and the database server 6 is incorporated in the operation control apparatus 7. When the occurrence of the "post processing" or the "burst processing" is detected in each server, the upper limits of the use rate and the use amount of the server resources of the concerned server (e.g. the CPU use rate and the memory use amount) are relatively set to the higher values, and when the occurrence of the "post processing" or the "burst processing" is not detected, the upper limits of the use rate and the use amount of the server resources (e.g. the CPU use rate and the memory use amount) are relatively set to the lower values. For example, when the occurrence of the "post processing" or the "burst processing" is detected in each server, the CPU use rate of the server resource of the concerned server is set to 60%. When the occurrence of the "post processing" or the "burst processing" is not detected in each server, the CPU use rate of the server resource of the concerned server is set to 80%. According to such an operation, the upper limits of the use rate and the use amount of the server resources can be appropriately set according to the existence or non-existence of the occurrence of the "post processing" or the "burst processing".

Another application example of the detection result of the occurrence of the "post processing" or the "burst processing" is an estimation of the use rate and the use amount of each of the resources used for the processing of one Web request. In the present Web application, a plurality of kinds of the Web requests are processed in one process. Apache is a typical software example used for the Web server. In such software, the CPU time to be consumed for the Web request cannot be specified for every kind of Web request, even if the CPU time to be consumed by the processes can be measured. Most of the Web servers and the database servers which are used at present perform such an operation. In such a situation, even if the CPU time and the memory use amount are calculated every process, it is not sufficient to manage the computer system, and it is desired to estimate the CPU time and the memory use amount which are used for the processing of one Web request. If a multiple regression analysis among the number of Web requests, the CPU time and the memory use amount is used, as described later, it is possible to estimate the use amount of each of the resources which are used for the processing of one Web request in a computer system. However, since the measurement data on the CPU time and the memory use amount obtained in the measurement period during which the "post processing" or the "burst processing" has occurred are not adaptive to a model of the multiple regression analysis, the measurement data are improper to use for the estimation. Therefore, for estimation of the use rate and the use amount of each of the resources which are used for the processing of one Web request, it is desirable to exclude in advance the measurement data obtained in the measurement period during which the "post processing" and the "burst processing" has occurred.

Below, A process of detecting the occurrence of the "post processing" or the "burst processing", and estimating the use rate and the use amount of each of the resources which are used for the processing of one Web request by using the detection result will be described.

Figure 9:
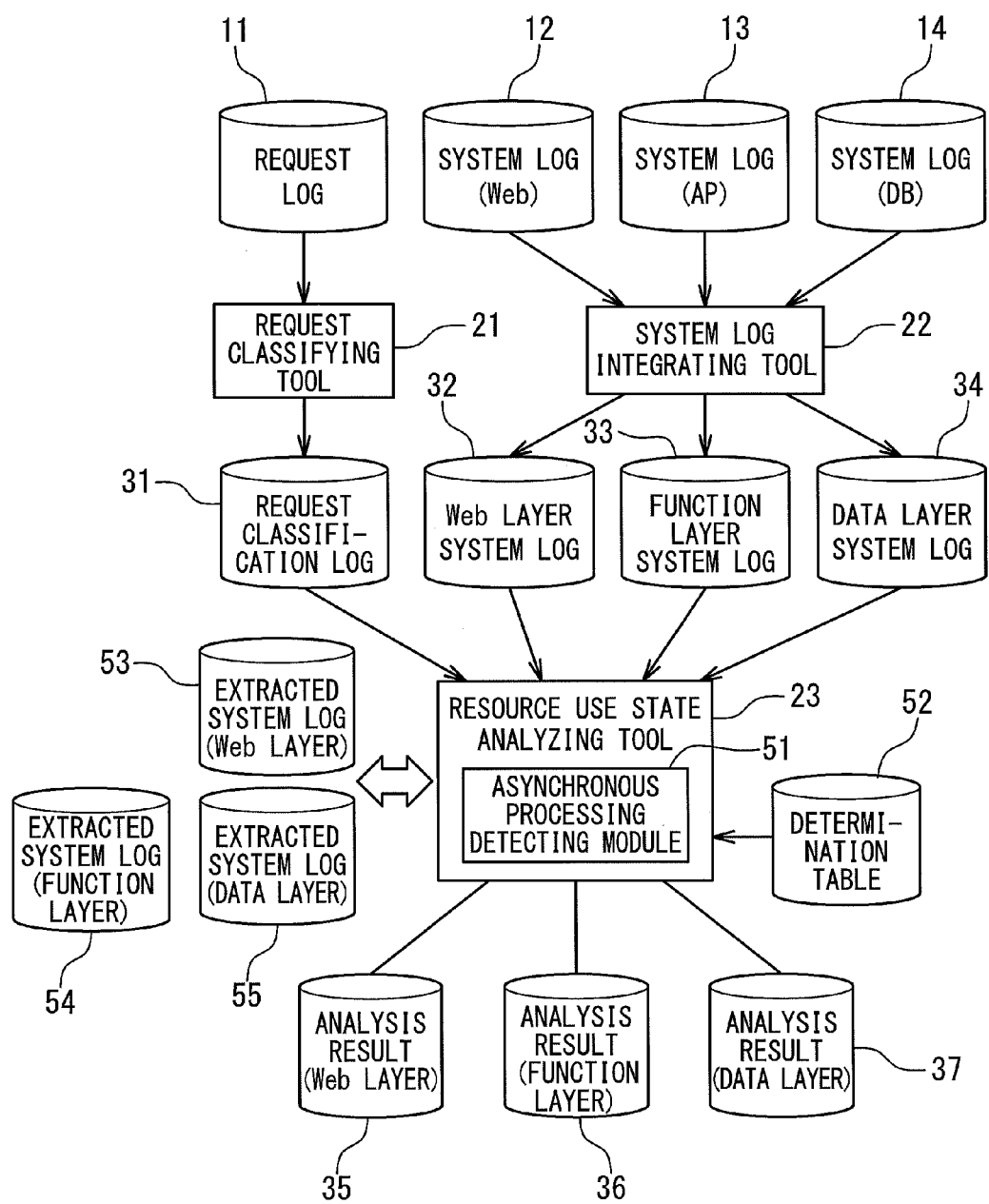
FIG. 9 is a diagram showing an example of the software configuration of the operation control apparatus 7 to estimate a use rate and a use amount of resources which are used for processing of one Web request.

FIG. 9 is a conceptual diagram showing a software configuration of the operation control apparatus 7 to estimate the use rate and the use amount of each of the resources which are used for the processing of one Web request. The request classifying tool 21 of the operation control apparatus 7 analyzes the request log 11 transmitted from the load distribution apparatus 3 and calculates the number of Web requests processed by the computer system 1 every measurement period and every kind of Web request, as described above. The calculation result is stored in the storage unit 7b as the request classification log 31. The system log integrating tool 22 generates the Web layer system log 32, the function layer system log 33, the data layer system log 34 from the system logs 12, 13 and 14 transmitted from the Web servers 4, the AP servers 5 and the DB server 6, respectively.

The resource use state analyzing tool 23 detects whether the "post processing" or the "burst processing" has occurred, in each measurement period by using the asynchronous processing detecting module 51. AS mentioned above, the determination table 52 is used for the detection of the occurrence of the "burst processing" or the "post processing". Moreover, the resource use state analyzing tool 23 excludes measurement data in the measurement period during which the "post processing" or the "burst processing" has occurred from the measurement data described in the Web layer system log 32, the function layer system log 33 and the data layer system log 34 and generates a Web layer extraction system log 53, a function layer extraction system log 54 and a data layer extraction system log 55.

Figure 10A:
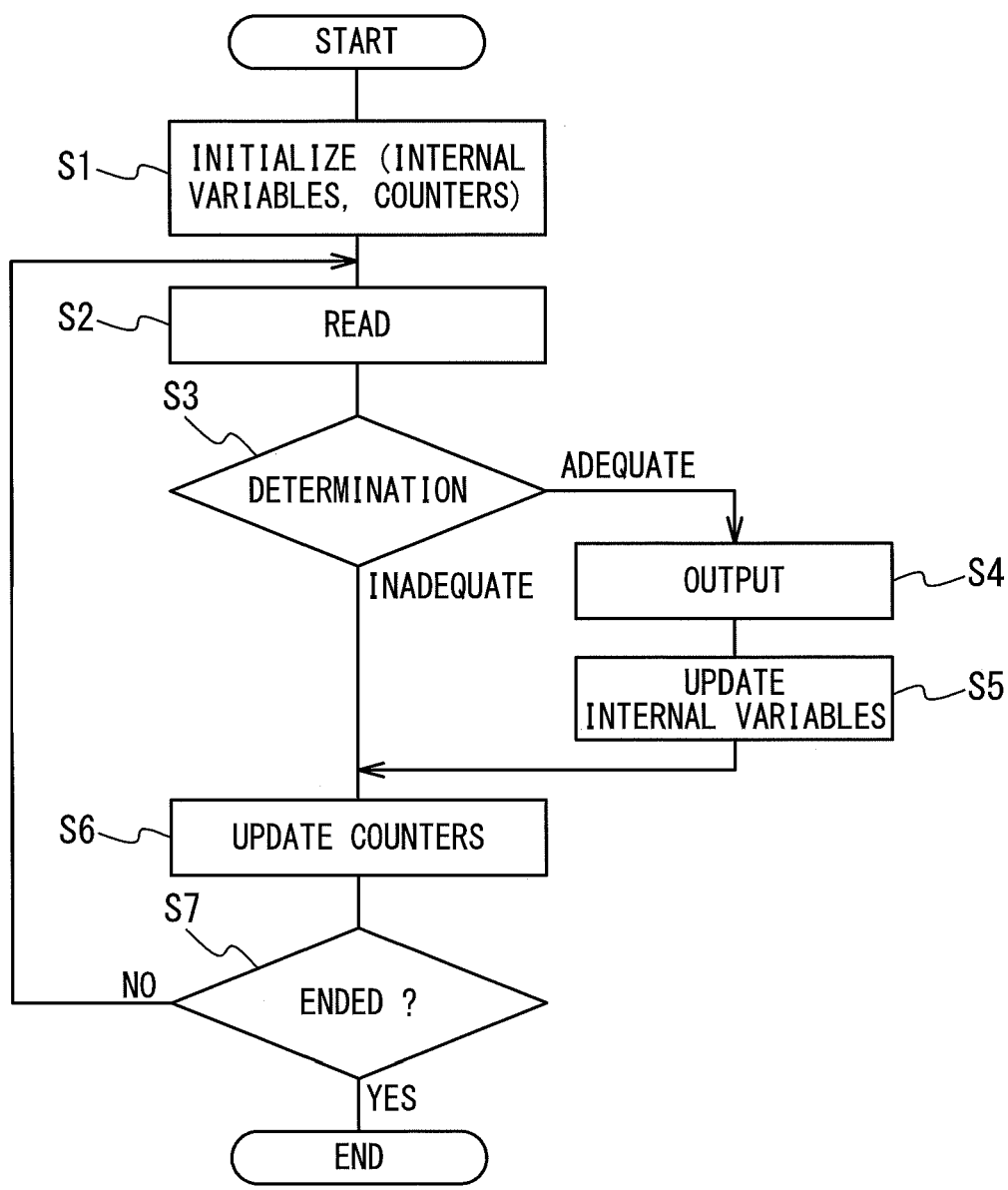
FIG. 10A is a flow chart showing an example of processing which generates extraction system log.

FIG. 10A is a flowchart showing the process which the resource use state analyzing tool 23 generates the Web layer extraction system log 53, the function layer extraction system log 54 and the data layer extraction system log 55. The process shown in FIG. 10A is obtained by adding the process (step S4) which the measurement data in the measurement period "t" during which the "post processing" or the "burst processing" has not occurred, as the Web layer extraction system log 53, function layer extraction system log 54 and data layer extraction system log 55 are outputted, to the process shown in FIG. 7.

When the "post processing" or the "burst processing" is judged to have occurred in a specific layer in the measurement period "t", a measurement data in the specific layer in the measurement period is judged to be "improper" and is removed. In this case, after the step S3 is executed, the control flow advances to the step S6.

On the other hand, when the "post processing" or the "burst processing" is judged not to have occurred in the Web layer in the measurement period "t", the measurement data in the Web layer in the measurement period "t" is judged to be "proper" for use to estimate the use amount of each of the resources. In this case, the measurement data in the Web layer in the measurement period "t" is outputted to a file which stores the Web layer extraction system log 53 at the step S4. In the same way, when the "post processing" or the "burst processing" is judged not to have occurred in the function layer in the measurement period "t", the measurement data in the function layer in the measurement period "t" are outputted to a file which stores the function layer extraction system log 54 at the step S4. Moreover, when the "post processing" or the "burst processing" is judged not to have occurred in the data layer in the measurement period "t", the measurement data in the data layer in the measurement period "t" are outputted to a file which stores data layer extraction system log 54 at the step S4.

Even when the existence or non-existence of the occurrence of the "post processing" or the "burst processing" cannot be strictly determined in a measurement period (in the case of "*" in FIGS. 8A to 8C), the measurement data in the measurement period is judged to be basically "proper" to use for the estimation of the use amount of each of the resources. However, the measurement data in the measurement period may be judged to be "improper" based on a setting by a manager. When being judged to be "improper", the measurement data in the measurement period are not outputted to the files of the Web layer extraction system log 53, the function layer extraction system log 54 and the data layer extraction system log 55, respectively.

Figure 10B:
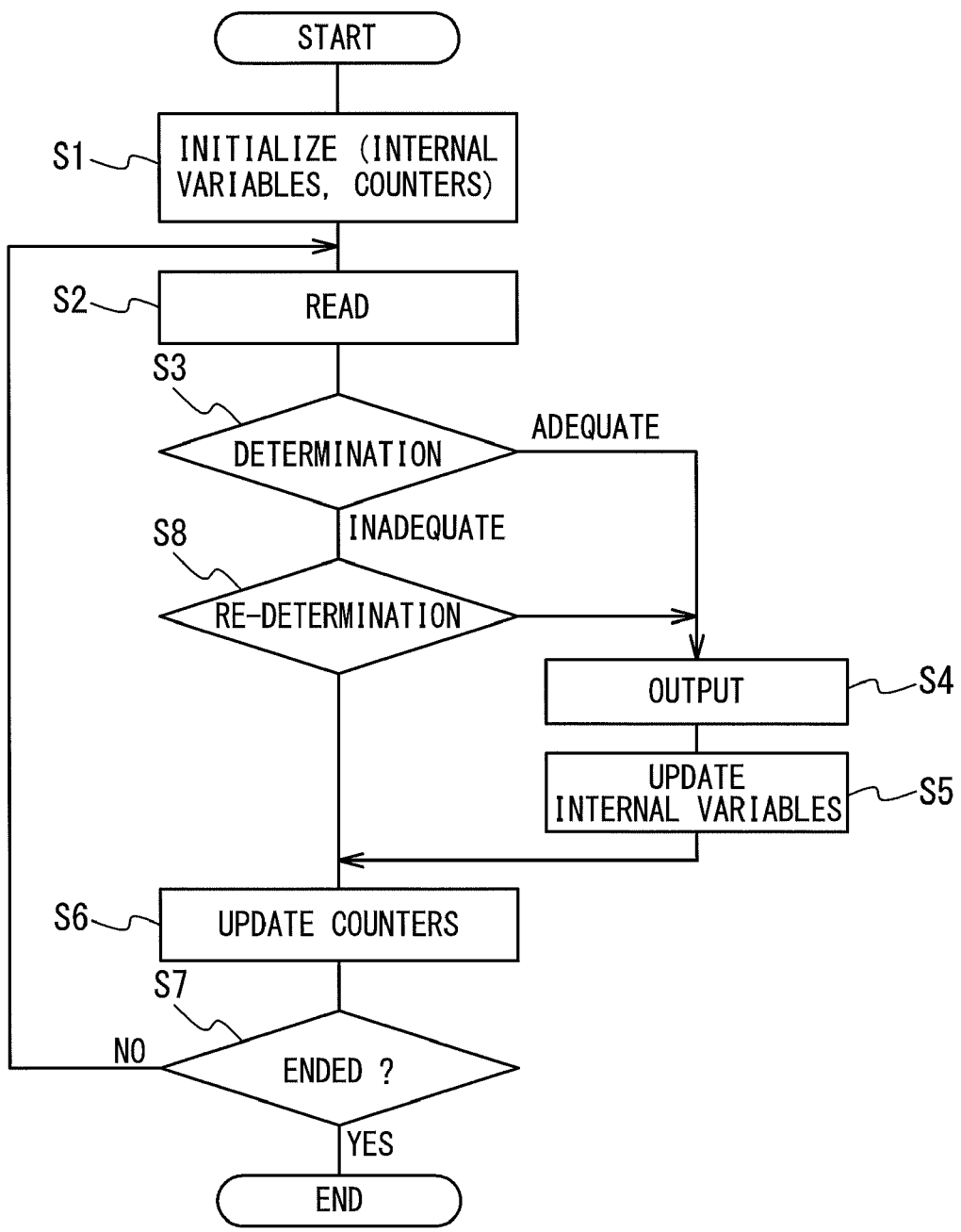
FIG. 10B is a flow chart showing another example of the processing which generates the extraction system log.

Although there is a possibility that the measurement data in continuous measurement periods are excluded in the process shown in FIG. 10A, it is not desirable for the estimation of the use amount of each of the resources which are used for the processing of one Web request that the measurement data are continuously excluded. As shown in FIG. 10B, a step S8 may be executed additionally.

Step S8:

When the measurement data in the measurement period "t" is judged to be "improper" to use for the estimation of the use amount of each of the resources at the step S3, a re-judgment is performed at step S8. At the step S8, the measurement periods during which the measurement data have been continuously removed is counted. When the count of the measurement periods exceeds a set value, the control flow advances to the step S4, to execute the same process as the case to have been judged to be "proper".

More specifically, at step S8, the internal variable pt indicating a value of the counter t corresponding to the measurement period in which the measurement data is removed and the internal variable p showing the number of measurement periods during which the measurement data are continuously removed are used. The internal variables p and a pt are initialized to 0 at the step S1. Also, a maximum permission value p_max indicating the number of measurement periods whose measurement data are continuously removed is set in advance. At the step S8, the value of counter t is compared with the value of the internal variable pt, and if $$pt+1=t$$

is met, the value of the internal variable p is increased by one and the value of the internal variable pt is overwritten by use of "t". When the value of the internal variable p exceeds p_max, the internal variables p and pt are initialized to 0 and the control flow advances to the step S4. The control flow advances to the step S6 if no.

When the Web layer extraction system log 53, the function layer extraction system log 54 and the data layer extraction system log 55 are generated, the resource use state analyzing tool 23 calculates use amounts of the resources which are necessary to process one Web request from the request classification log 31, the Web layer extraction system log 53, the function layer extraction system log 54 and the data layer extraction system log 55. The use amount of the resource which is necessary to process the one Web request is calculated for every kind of Web request to each of the Web layer, the function layer, and the data layer. In the present exemplary embodiment, the resource use state analyzing tool 23 calculates the CPU time and the memory use amount which are necessary to process the Web request, for each of the Web layer, the function layer, and the data layer. The CPU time and the memory use amount which are consumed in the Web layer to process the Web request are calculated as follows:

First, a case that all the measurement periods take a constant value Δt in length will be described. Supposing that the measurement period is "i", the CPU use rate as the whole Web layer is $\rho^W(i)$, the memory use amount as the whole Web layer is $M^W(i)$, the number of processed Web requests of the kind "Rj" is $N_{Rj}(i)$, and the CPU time and the memory use amount in the Web layer necessary to process one Web request of the kind "Rj" are $U_{Rj}^W$ and $M_{Rj}^W$, the following equation is met:

$$\Delta t \cdot \rho^W(i) = \sum_j N_{Rj}(i) \cdot U_{Rj}^W + \Delta t \cdot \rho_Z^W, \quad (1a)$$

$$M^W(i) = \sum_j N_{Rj}(i) \cdot M_{Rj}^W + M_Z^W, \quad (1b)$$

where Δt is a length of each measurement period, $\rho_Z^W$ is the CPU use rate as the whole Web layer under the situation that the processing of the Web request is not performed, $M_Z^W$ is the memory use amount in the Web layer under the situation that the processing of the Web request is not performed, and Σ means a summation of the Web requests of all the kinds. The number of Web requests $N_{Rj}(i)$ of the kind "Rj" is described in the request classification log 31.

The CPU use rate $\rho^W(i)$ and the memory use amount $M^W(i)$ in the whole Web layer, are described in extraction Web layer system log 52.

It should be noted that in the computer system, generally, the resources to an extent are used to maintain the operation regardless of the existence or non-existence of the Web request. For example, in the Web server on which Apache operates, a predetermined number of processes operate indissolubly regardless of the existence or non-existence of the Web request. Therefore, the CPU and the memory are used only to maintain the system to the state in which it is possible to execute the processes. A process to manage the system in many cases operates in the computer system and the CPU and the memory are used by this process. Below, the CPU use rate under the situation that the processing of the Web request is not performed (in request processing non-performing state) is referred to as a default CPU use rate, and the memory use amount under the situation that the processing of the Web request is not performed is referred to as a default memory use amount.

A problem to calculate the CPU time $U_{Rj}^W$ and $\Delta t \cdot \rho_Z^W$ for the Web request of the kind "Rj" from a plurality of measurement data $\rho^W(1)$ to $\rho^W(m)$ and $N_{Rj}(1)$ to $N_{Rj}(m)$ can be solved by the multiple regression analysis. Specifically, the CPU times $U_{R1}^W, U_{R2}^W, \ldots$ and $\Delta t \cdot \rho_Z^W$ are calculated by the following equation:

$$\begin{bmatrix} U_{R1}^W \\ U_{R2}^W \\ \vdots \\ U_{Rn}^W \\ \Delta t \cdot \rho_Z^W \end{bmatrix} = ({}^tX \ X)^{-1}{}^tX \begin{bmatrix} \Delta t \cdot \rho^W(1) \\ \Delta t \cdot \rho^W(2) \\ \vdots \\ \Delta t \cdot \rho^W(m) \end{bmatrix}, \quad (2a)$$

Here, ${}^tX$ is a transposed matrix of a matrix X and the matrix X is shown by the following equation:

$$X = \begin{bmatrix} N_{R1}(1) & N_{R2}(1) & \ldots & N_{Rn}(1) & 1 \\ N_{R1}(2) & N_{R2}(2) & \ldots & N_{Rn}(2) & 1 \\ \vdots & \vdots & \ddots & \vdots & \vdots \\ N_{R1}(m) & N_{R2}(m) & \ldots & N_{Rn}(m) & 1 \end{bmatrix}. \quad (2b)$$

It should be noted that the number of times m of the measurement is set to a value which is larger than the number of kinds n of the Web requests and at which an inverse matrix of a matrix $({}^tX \ X)$ exists.

The memory use amounts $M_{R1}^W, M_{R2}^W, \ldots$ and $M_Z^W$ are calculated in the same way from the following equation:

$$\begin{bmatrix} M_{R1}^W \\ M_{R2}^W \\ \vdots \\ M_{Rn}^W \\ M_Z^W \end{bmatrix} = ({}^tX \ X)^{-1}{}^tX \begin{bmatrix} M^W(1) \\ M^W(2) \\ \vdots \\ M^W(m) \end{bmatrix}, \quad (3)$$

Also, it should be noted that the columns corresponding to the measurement data judged to be "improper (the "post processing" or the "burst processing" has occurred) are excluded in vectors/matrixes of the equations (2a), (2b), and (3).

The calculated CPU times $U_{R1}^W, U_{R2}^W, \ldots, U_{Rn}^W$, default CPU use rate $\rho_Z^W$, memory use amount $M_{R1}^W, M_{R2}^W, \ldots, M_{Rn}^W$ and default memory use amount $M_Z^W$ are stored in the storage unit 7b as analysis result data 36 of the Web layer.

A similar procedure is performed to the function layer and the data layer. The CPU time and the memory use amount which are consumed in the function layer to process one Web request, and the default CPU use rate and the default memory use amount in the function layer are calculated by the same procedure as described above from the request classification log 31 and the function layer system log 33. The calculated CPU time, memory use amount, default CPU use rate and default memory use amount are stored in the storage unit 7b as analysis result data 36 in the function layer. Below, the CPU time and the memory use amount which are consumed to process one Web request of the kind "Rj" in the function layer are referred to as $U_{Rj}^F$ and $M_{Rj}^F$, respectively. The default CPU use rate and the memory use amount in the function layer are referred to as $\rho_Z^F$ and $M_Z^F$, respectively.

Similarly, the CPU time and the memory use amount which are consumed in the data layer to process one Web request, the default CPU use rate and the default memory use amount in the data layer are calculated by the same procedure as described above from the request classification log 31 and the data layer system log 34. The calculated CPU time, memory use amount, default CPU time and default memory use amount are stored in the storage unit 7b as analysis result data 37 in the data layer. Below, the CPU time and the memory use amount which are consumed to process one Web request of the kind "Rj" in the data layer are referred to as $U_{Rj}^D$ and $M_{Rj}^D$, respectively, and the default CPU time and the memory use amount in the function layer are referred to as $\rho_Z^D$ and $M_Z^D$, respectively.

The length of the measurement period may be variable. In this case, instead of the equation (1a), the following equation is met:

$$\Delta t(i) \cdot \rho^W(i) = \sum_j N_{Rj}(i) \cdot U_{Rj}^W + \Delta t(i) \cdot \rho_Z^W. \quad (1a')$$

Here, $\Delta t(i)$ is the length of the measurement period "i". It should be noted that the equation (1b) is met just as it is, even in the case that the length of the measurement period is variable.

If using a relation of the equations (1a') and (1b), the CPU time $U_{Rj}^W$ and the default CPU use rate for the Web request of the kind "Rj" can be calculated by a multiple regression analysis even in the case of the measurement period of variable length. More Specifically, it is possible to calculate the CPU times $U_{R1}^W, U_{R2}^W, \ldots$ and $\rho_Z^W$ from the following equation by using a plurality of measurement data $\rho^W(1)$ to $\rho^W(m)$, $N_{Rj}(1)$ to $N_{Rj}(m)$ and the length $\Delta t(i)$ in the measurement period:

$$\begin{bmatrix} U_{R1}^W \\ U_{R2}^W \\ \vdots \\ U_{Rn}^W \\ \rho_Z^W \end{bmatrix} = ({}^tY\ Y)^{-1}\,{}^tY \begin{bmatrix} \Delta t(1) \cdot \rho^W(1) \\ \Delta t(2) \cdot \rho^W(2) \\ \vdots \\ \Delta t(m) \cdot \rho^W(m), \end{bmatrix} \quad (2a')$$

Here, ${}^tY$ is a transposed matrix of the matrix Y which is shown by the following equation:

$$Y = \begin{bmatrix} N_{R1}(1) & N_{R2}(1) & \ldots & N_{Rn}(1) & \Delta t(1) \\ N_{R1}(2) & N_{R2}(1) & \ldots & N_{Rn}(1) & \Delta t(2) \\ \vdots & \vdots & \ddots & \vdots & \vdots \\ N_{R1}(m) & N_{R2}(m) & \ldots & N_{Rn}(m) & \Delta t(m) \end{bmatrix}, \quad (2b')$$

In the same way, it is possible to calculate the memory use amounts $M_{R1}^W, M_{R2}^W, \ldots, M_{Rn}^W$ and the default memory use amount $M_Z^W$ from the following equation:

$$\begin{bmatrix} M_{R1}^W \\ M_{R2}^W \\ \vdots \\ M_{Rn}^W \\ M_Z^W \end{bmatrix} = ({}^tY\ Y)^{-1}\,{}^tY \begin{bmatrix} M^W(1) \\ M^W(2) \\ \vdots \\ M^W(m), \end{bmatrix} \quad (3')$$

Also, in the above-mentioned exemplary embodiment, the CPU time and the memory use amount are analyzed but can perform a similar analysis to the other resources. For example, the similar analysis can be performed to the use amount (generally, byte/sec) of the network interface and the use amount (generally, byte/sec) of the disk interface (SCSI interface). As for the use amount of the network interface and the disk interface, a case of "write" and a case of "read" may be separately analyzed. Not the use amount of the disk interface but the use rate of the disk interface may be analyzed. In this case, the use rate $\pi$ of the disk interface may be defined by the following equation by using the queue length W of the disk:

$$\pi = Q/(Q+1).$$

In the present exemplary embodiment, the analysis result data 35, 36 and 37 to the Web layer, the function layer and the data layer obtained by the resource use state analyzing tool 23 (i.e. the CPU time, the memory use amount, the default CPU use rate and default memory use amount consumed in each of the Web layer, the function layer, and the data layer to process one Web request) are used for the following two purposes. At first, the analysis result data 35, 36, and 37 for the Web layer, the function layer and the data layer are used for charging a fee to the user. A unit price which is charged to process one Web request from analysis result data 35, 36, and 37 is calculated every kind of Web request, and the fee which is charged on each user is determined from the number of Web requests and the calculated unit price.

At second, the analysis result data 35, 36, and 37 for the Web layer, the function layer and the data layer are used to analyze the load and ability of the computer system 1 from the viewpoint of the kinds of the Web requests. For example, the use rate of a specific resource in each measurement period is analyzed every kind of Web request by using analysis result data 35, 36, and 37. Also, the use rate of each of the resources in the specific measurement period is analyzed every kind of Web request by using analysis result data 35, 36, and 37.

Figure 11:
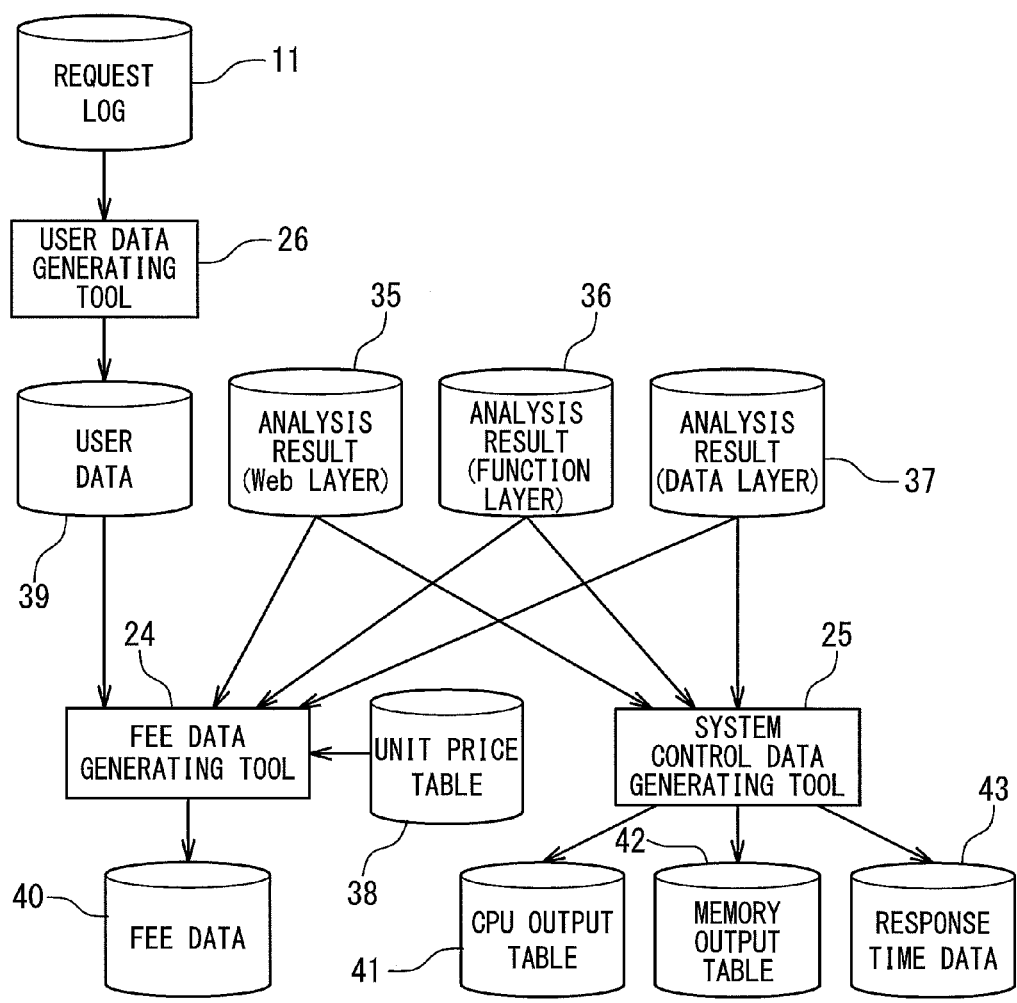
FIG. 11 is a diagram showing the software configuration for charging a fee and analyzing load and ability of the computer system.

FIG. 11 is a diagram showing the software configuration for a fee charging process and an analyzing process of the load and ability of the computer system 1. A fee data generating tool 24, a system control data generating tool 25 and a user data generating tool 26 are installed in the operation control apparatus 7. The fee charging process and the analyzing process of the load and ability of the computer system 1 is performed by these tools. Hereinafter, the fee charging process and the analyzing process of the load and ability of the computer system 1 will be described in detail.

(Fee Charging Process)

The use fee which is charged on each user is desirable to be basically determined based on the use amounts of the resources which are required to process the Web request issued from the user.

One problem is in that resources are consumed in order to maintain the operation of the computer system 1 (regardless of the existence or non-existence of a Web request). Especially, even if the Web request is not processed, the memory is used in order to set a state in which a process can be executed. Therefore, a large portion of the memory is used irrespective of the existence or non-existence of the Web request. In such a situation, there is a case that it is preferable that any fee is charged on each user for the use amounts of the resources to maintain the operation of the computer system 1 (to be referred to as a common resource use amount, below).

Another problem is in that the resources are used even in the measurement period during which the measurement data are removed because the "post processing" or the "burst processing" are detected. There is a case that it is preferable that any fee is charged on each user for these resource use amounts.

In the fee charging processing of the present exemplary embodiment, a proper fee charging for the common resource use amount is realized by distributing a use fee of the common resource use amount to the Web requests. In addition, in the present exemplary embodiment, the proper fee charging for the resource use amount in the measurement period is realized by distributing to the Web requests, the use fee for the resource use amount in the measurement periods during which the "post processing" or the "burst processing" is detected. Hereinafter, the fee charging processing which is performed by the present exemplary embodiment will be described in detail. It should be noted that in the present exemplary embodiment, although the fee charging processing in the Web layer will be described, the same processing can be applied to the other layers (the function layer and the data layer).

As shown in FIGS. 12A and 12B, a unit price table 38 is provided in the storage unit 7b of the operation control apparatus 7 and the unit price table 38 is used for the fee charging processing. When the length of each of the measurement periods is constant value $\Delta t$, the CPU unit price and memory unit price per a unit measurement period (5 minutes in the present exemplary embodiment) in each of the Web layer, the function layer and the data layer are described in the unit price table 38, in the 1 exemplary embodiment, as shown in FIG. 12A. Below, the CPU unit price per the unit measurement period (5 minutes in the present exemplary embodiment) in the Web layer is described as $C_{CPU}^W$ and the memory unit price per the unit measurement period is described as $C_M^W$.

On the other hand, when the length of the measurement period is variable, the CPU unit price and memory unit price per a unit time in each of the Web layer, the function layer and the data layer may be described in the unit price table 38. In this case, the CPU unit price for the measurement period "i" in the Web layer is $\Delta t(i) \cdot C_{CPU}^W$, supposing that the CPU unit price per the unit time in the Web layer is $C_{CPU}^W$. In the same way, the memory unit price for the measurement period "i" in the Web layer is $\Delta t(i) \cdot C_M^W$, supposing that the memory unit price per the unit time in the Web layer is $C_M^W$.

Instead, as shown in FIG. 12B, a computer system operation cost in the Web layer per the measurement period (or unit time), a contribution rate of the CPU and a contribution rate of the memory may be described in the unit price table 38. When the length of all the measurement periods is constant, a CPU unit price per the measurement period is calculated by multiplying the contribution rate of the CPU to the computer systems operation cost per the measurement period. Also, a memory unit price per the measurement period is calculated by multiplying the contribution rate of the memory by the computer systems operation cost in the Web layer. On the other hand, when the length of the measurement period is variable, the CPU unit price per the unit time is calculated by multiplying the contribution rate of the CPU to the computer systems operation cost per the unit period. Also, a memory unit price per the unit time is calculated by multiplying the contribution rate of the memory by the computer systems operation cost per the unit period in the Web layer.

The fee data generating tool 24 uses the analysis result data 35 in the Web layer and the CPU unit price $C_{CPU}^W$ and memory unit price $C_M^W$ described in the unit price table 38 to determine the unit price of the Web layer to one Web request. Specifically, the unit price $\mu_{Rj}^W(i)$ of the Web layer to the processing of one Web request of the kind "Rj" in the measurement period "i" is determined as follows.

The CPU time which is consumed to process the Web request of the kind "Rj" in the measurement period "i" is $N_{Rj}(i) \cdot U_{Rj}^W$. Also, the default CPU time which is consumed with no relation to the processing of the Web request in each measurement period is $\Delta t \cdot \rho_Z^W$ when the length in the period of all measurement is constant value $\Delta t$, and when the length of the measurement period is variables, it is $\Delta t(i) \cdot \rho_Z^W$.

In the present exemplary embodiment, a "virtual CPU time" in the Web layer is determined by distributing the default CPU time $\Delta t \cdot \rho^W$ which is consumed regardless of the processing of the Web request in the Web layer to each of the kinds of the Web requests. Specifically, when the length of all the measurement periods is constant, the virtual CPU time $CPU\_Rj^W(i)$ of the Web request of the kind "Rj" in the Web layer in the measurement period "i" is calculated from the following equation:

$$CPU\_Rj^W(i) = N_{Rj}(i) \cdot U_{Rj}^W + \Delta t \cdot \rho_Z^W \cdot \frac{N_{Rj}(i) \cdot U_{Rj}^W}{\sum_j N_{Rj}(i) \cdot U_{Rj}^W}, \quad (4)$$

The first term of the equation (4) is the CPU time which is actually consumed in the Web layer to process the Web request of the kind "Rj" as above-mentioned. On the other hand, the second term is a distributed portion of the default CPU time $\Delta t \cdot \rho_Z^W$ which is consumed regardless of the processing of the Web request in the Web layer, to the Web request of the kind "Rj".

On the other hand, when the length of the measurement period is variable, the virtual CPU time $CPU\_Rj^W(i)$ is calculated from the following equation:

$$CPU\_Rj^W(i) = N_{Rj}(i) \cdot U_{Rj}^W + \Delta t(i) \cdot \rho_Z^W \cdot \frac{N_{Rj}(i) \cdot U_{Rj}^W}{\sum_j N_{Rj}(i) \cdot U_{Rj}^W}, \quad (4')$$

As mentioned above, the CPU unit price $\mu_{Rj}^{CPU}(i)^W$ of one Web request of the kind "Rj" in the Web layer in the measurement period "i" is calculated from the following equation by using the virtual CPU time, when the length of all the measurement periods is constant, $$\mu_{Rj}^{CPU}(i)^W = \frac{1}{N_{Rj}(i)} \cdot C_{CPU}^W \cdot \frac{CPU\_Rj^W(i)}{\sum_j CPU\_Rj^W(i)}, \quad (5)$$

and when the length of the measurement period is variable, $$\mu_{Rj}^{CPU}(i)^W = \frac{1}{N_{Rj}(i)} \cdot c_{CPU}^W \cdot \Delta t(i) \cdot \frac{CPU\_Rj^W(i)}{\sum_j CPU\_Rj^W(i)}, \quad (5')$$

The memory unit price $\mu_{Rj}^M(i)^W$ of the Web layer is calculated in the same way about the memory use amount, too. More Specifically, the "virtual memory use amount" $M\_Rj^W(i)$ of the Web request of the kind "Rj" in the measurement period "i" in the Web layer is calculated from the following equation:

$$M\_Rj^W(i) = N_{Rj}(i) \cdot M_{Rj}^W + M_Z^W \cdot \frac{N_{Rj}(i) \cdot M_{Rj}^W}{\sum_j N_{Rj}(i) \cdot M_{Rj}^W}, \quad (6)$$

Here, $M_{Rj}^W$ is a memory use amount in the Web layer to process one Web request of the kind "Rj". On the other hand, $\rho_Z^W$ is the default memory use amount in the Web layer.

Moreover, when the length of all the measurement periods is constant, the memory unit price $\mu_{Rj}^{M}(i)^{W}$ of one Web request of the kind "Rj" in the measurement period "i" in the Web layer is calculated from the following equation, $$\mu_{Rj}^{M}(i)^{W} = \frac{1}{N_{Rj}(i)} \cdot C_{M}^{W} \cdot \frac{M\_Rj^{W}(i)}{\sum_{j} M\_Rj^{W}(i)}, \quad (8)$$

and when the length of the measurement period is variable, $$\mu_{Rj}^{M}(i)^{W} = \frac{1}{N_{Rj}(i)} \cdot c_{M}^{W} \cdot \Delta t(i) \cdot \frac{M\_Rj^{W}(i)}{\sum_{j} M\_Rj^{W}(i)}, \quad (8')$$

The unit price $\mu_{Rj}^{W}(i)$ of one Web request of the kind "Rj" in the measurement period "i" in the Web layer is calculated as a summation of the CPU unit price $\mu_{Rj}^{CPU}(i)^{W}$ and the memory unit price $\mu_{Rj}^{M}(i)^{W}$. That is, the unit price $\mu_{Rj}^{W}(i)$ of one Web request in the Web layer is calculated from the following equation:

$$\mu_{Rj}^{W}(i) = \mu_{Rj}^{CPU}(i)^{W} + \mu_{Rj}^{M}(i)^{W} \quad (9a)$$

By calculating a's taking a summation of products of the number of Web requests processed in a portion of the measurement periods "1" to "m" from which the measurement data are not removed and the unit price $\mu_{Rj}^{W}(i)$ calculated from the equation (9a), the cost $N_{Rj}^{W}$ in the Web layer to the processing of the Web requests of the kind Rj can be calculated from the following equation:

$$N_{Rj}^{W} = \Sigma \mu_{Rj}^{W}(i) \cdot N_{Rj}(i) \quad (9b)$$

In the equation (9b), $\Sigma$ means the summation with respect to the measurement periods in which the measurement data are not excluded, of the measurement periods "1" to "m".

Moreover, the Web requests issued by each user in the measurement period are counted every kind of Web request by the user data generating tool 26, and the user data 39 indicating the count result is stored in the storage unit 7b. FIG. 13 is a table showing an example of the contents of the user data 39. In the example of FIG. 13, the measurement period is 5 minutes. In the table of FIG. 13, "$N_{RjUk}(i)$" means the number of Web requests of the kind "Rj" issued by a user Uk in the measurement period "i".

The fee data generating tool 24 calculates the charge $F_{Uk}^{W}(i)$ of the Web layer which is charged on each user Uk in the measurement period "i" by the following equation based on the unit price $\mu_{Rj}^{W}(i)$ in the Web layer of each of the Web requests and the user data 39:

$$F_{Uk}^{W}(i) = \Sigma \mu_{Rj}^{W}(i) \cdot N_{RjUk}(i) \quad (10a)$$

In the equation (10a), $\Sigma$ means a summation with respect to all the kinds of the Web requests. By calculating a summation of the unit price $F_{Uk}^{W}(i)$ obtained in the equation (10a) over the measurement periods, in which measurement data are not excluded, of the measurement periods "1" to "m", the fee $F_{Uk}^{W}$ of the Web layer where is charged on user Uk in the measurement periods in which the measurement data are not excluded can be calculated from the following equation:

$$F_{Uk}^{W} = \Sigma F_{Uk}^{W}(i) \quad (10b)$$

In the equation (9a), $\Sigma$ means a summation over the measurement periods in which the measurement data are not excluded, among the measurement periods "1" to "m".

In the above-mentioned processing, the cost for the measurement periods in which the measurement data are not excluded is not distributed to each user. An increment $\Delta F_{Uk}^{W}$ of the fee charged on each user Uk for the measurement periods in which the measurement data are excluded is calculated as follows.

First, a case that the length of the measurement period is constant will be described. It is assumed that the measurement periods in which measurement data are excluded in the Web layer are L values of $p_1, p_2, \ldots, p_L$ (L<m). At this time, the cost (L·$C_{CPU}^{W}$) corresponding to the CPU time in the L measurement periods is stored in the storage unit 7b of the operation control apparatus 7 as the un-distributed cost of the CPU time in the Web layer. In the same way, the un-distributed cost of the memory (L·$C_{M}^{W}$) in the Web layer is stored in the storage unit 7b. The summation of these un-distributed costs is a total of un-distributed cost (L·$C_{CPU}^{W}$+L·$C_{M}^{W}$) in the Web layer. By proportionally distributing the fee $F_{Uk}^{W}$ of the Web layer where the un-distributed cost (L·$C_{CPU}^{W}$+L·$C_{M}^{W}$) can be charged on user Uk, the increment $\Delta F_{Uk}^{W}$ of the fee that is charged on each user Uk for the measurement periods in which the measurement data are excluded can be calculated from the following equation:

$$\Delta F_{Uk}^{W} = (L \cdot C_{CPU}^{W} + L \cdot C_{M}^{W}) \frac{F_{Uk}^{W}}{\sum_{Uk} F_{Uk}^{W}}, \quad (10c)$$

Here, $\Sigma$ means a summation over all the users Uk. The fee of the Web layer which is charged on the user Uk is calculated as $F_{Uk}^{W} + \Delta F_{Uk}^{W}$, by using the increment $\Delta F_{Uk}^{W}$.

On the other hand, when the length of the measurement period is variable, the cost corresponding to the CPU times in the measurement periods $p_1, p_2, \ldots, p_L$ in which the measurement data are excluded in the Web layer is $\Sigma C_{CPU}^{W} \cdot \Delta t(p_i)$, and the cost corresponding to the memory use amount is $\Sigma C_{CPU}^{W} \cdot \Delta t(p_i)$. Here, $\Sigma$ is a summation over the measurement periods $p_1, p_2, \ldots, p_L$ in which the measurement data are excluded in the Web layer. By dividing as follows proportionally using the charge $F_{Uk}^{W}$ of the Web layer where this un-distributed cost can be charged on user Uk like the above The increment $\Delta F_{Uk}^{W}$ of the fee charged on each user Uk in the measurement periods that the measurement data are excluded is calculated:

$$\Delta F_{Uk}^{W} = \sum_{p_i} \{(c_{CPU}^{W} \cdot \Delta t(p_i) + c_{M}^{W} \cdot \Delta t(p_i)\} \cdot \frac{F_{Uk}^{W}}{\sum_{Uk} F_{Uk}^{W}}, \quad (10d)$$

Here, $\Sigma$ on the left hand is a summation over the measurement periods $p_1, p_2, \ldots, p_L$ in which the measurement data are excluded in the Web layer and $\Sigma$ on the right side means a summation over all the users Uk. The fee of the Web layer which is charged on the user Uk is calculated as $F_{Uk}^{W} + \Delta F_{Uk}^{W}$ by using the increment $\Delta F_{Uk}^{W}$. The fees $F_{Uk}^{F} + \Delta F_{Uk}^{F}$ and $F_{Uk}^{D} + \Delta F_{Uk}^{D}$ which are charged on the user in the same way are calculated for the other two layers, i.e. the function layer and the data layer. The fee data generating tool 24 generates and stores the fee data 40 which describes $F_{Uk}^{W} + \Delta F_{Uk}^{W}$, $F_{Uk}^{F} + \Delta F_{Uk}^{F}$, and $F_{Uk}^{D} + \Delta F_{Uk}^{D}$ which are charged on each user Uk are in the storage unit 7b.

(Analysis of the Load and Ability of the Computer System)

The analysis of the load and ability of the computer system 1 is performed by the system control data generating tool 25.

Specifically, the system control data generating tool 25 generates the following data from the analysis result data 35, 36, and 37 in the above-mentioned Web layer, the function layer and the data layer.

First, the system control data generating tool 25 has a function to calculate a use rate and a use amount of resources in each of the Web layer, the function layer, and the data layer every kind of Web request and every measurement period. In the present exemplary embodiment, the system control data generating tool 25 calculates a CPU use rate on the each layer every kind of Web request and every measurement period from the analysis result data 35, 36, and 37 of the Web layer, the function layer and the data layer. The CPU output table 41 describing the calculated CPU use rate is stored in the storage unit 7b. When the length of all the measurement periods is constant, the CPU use rate $\psi_{Rj}^W(i)$ of the Web request of the kind "Rj" in the measurement period "i" in the Web layer, the CPU use rate $\psi_{Rj}^F(i)$ in the function layer, and the CPU use rate $\psi_{Rj}^D(i)$ in the data layer are calculated from the following equations:

$$\psi_{Rj}^W(i) = N_{Rj}(i) \cdot U_{Rj}^W / \Delta t \quad (11a)$$

$$\psi_{Rj}^F(i) = N_{Rj}(i) \cdot U_{Rj}^F / \Delta t \quad (11b)$$

$$\psi_{Rj}^D(I) = N_{Rj}(i) \cdot U_{Rj}^D / \Delta t \quad (11c)$$

When the length of the measurement period is variable, they are calculated from the following equations:

$$\psi_{Rj}^W(i) = N_{Rj}(i) \cdot U_{Rj}^W / \Delta t(i) \quad (12a)$$

$$\psi_{Rj}^F(i) = N_{Rj}(i) \cdot U_{Rj}^F / \Delta t(i) \quad (12b)$$

$$\psi_{Rj}^D(i) = N_{Rj}(i) \cdot U_{Rj}^D / \Delta t(i) \quad (12c)$$

FIG. 14A show a part of CPU output table 41 corresponding to the Web layer. It should be noted that the CPU use rate $\psi_{Rj}^W(i)$ of the Web request of the kind Rj in the Web layer is not calculated for one Web request of the kind "Rj" but calculated for the whole Web requests of the kind "Rj". This is true to the CPU use rate $\psi_{Rj}^F(i)$ and $\psi_{Rj}^D(i)$ in the function layer and the data layer.

Moreover, the system control data generating tool 25 calculates the memory use amount in each of the Web layer, the function layer, and the data layer every kind of Web request and every measurement period and stores the memory output table 42 in which the calculated memory use amounts are described, in the storage unit 7b. FIG. 14B is a table showing a part, corresponding to the Web layer, of the memory output table 42. In the present exemplary embodiment, the memory use amount $\phi_{Rj}^W(i)$ of the Web request of the kind "Rj" in the measurement period "i" in the Web layer, the memory use amount $\phi_{Rj}^F(i)$ in the function layer, and the memory use amount $\phi_{Rj}^D(i)$ in the data layer are calculated from the following equations:

$$\phi_{Rj}^W(i) = N_{Rj}(i) \cdot M_{Rj}^W \quad (13a)$$

$$\phi_{Rj}^F(i) = N_{Rj}(i) \cdot M_{Rj}^F \quad (13b)$$

$$\phi_{Rj}^D(i) = N_{Rj}(i) \cdot M_{Rj}^D \quad (13c)$$

FIG. 14B shows a part corresponding to the Web layer, of the memory output table 42.

Figure 15A:
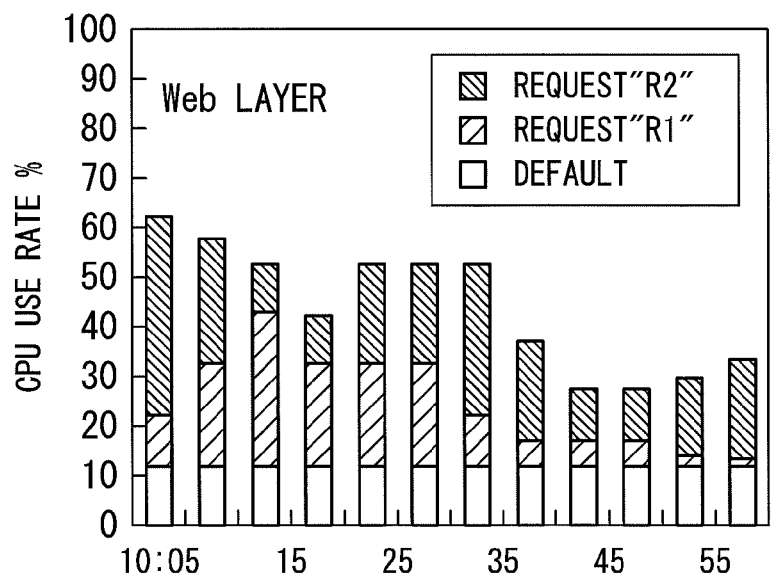
FIG. 15A is an example of a graph showing a CPU use rate every kind of a Web request.

Moreover, the system control data generating tool 25 has a function to display the contents of the CPU output table 41 and the memory output table 42 in graph. Specifically, the system control data generating tool 25 has a function to display the use rate and use amount of each of resources every kind of Web request in each measurement period in graph. For example, as shown in FIG. 15A, the system control data generating tool 25 displays the CPU use rate and the default CPU use rate in the Web layer every kind of Web request in each measurement period in graph. Similarly, the system control data generating tool 25 displays the memory use amount in graph. Such a graph is useful to grasp the present situation of the computer system 1.

Figure 15B:
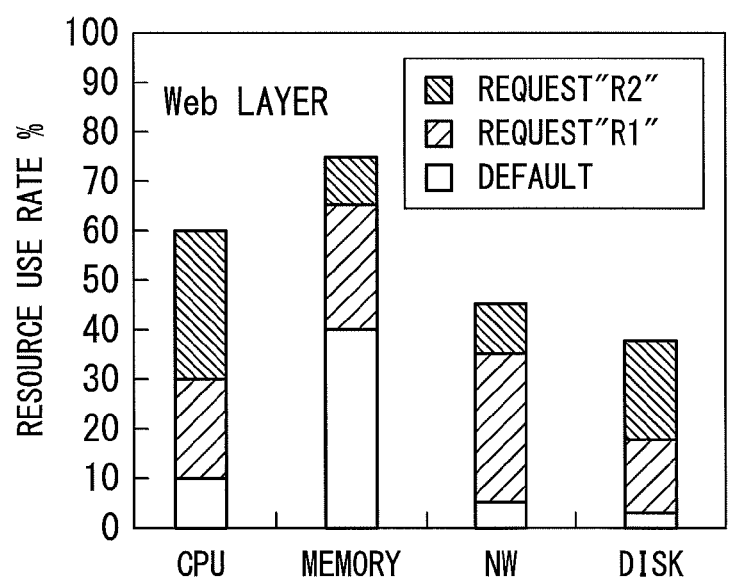
FIG. 15B is an example of a graph which displays the use rate of each of resources in a specific measurement period every kind of Web request.

Moreover, the system control data generating tool 25 has a function to display a use situation of each of the resources in a specific measurement period every kind of Web request. For example, as shown in FIG. 15B, the system control data generating tool 25 displays the CPU use rate, the memory use rate, a network use rate, and a disk use rate in the Web layer in the specific measurement period (10:00 to 10:05 in FIG. 15B) every kind of Web request in graph. Here, the memory use rate of the Web request of the kind "Rj" in the Web layer is a numerical value which is obtained by dividing an actual memory use amount $M_{Rj}^W$ in the Web layer by the whole memory amount which is managed by the operating system. The whole memory amount which is managed by the operating system is a value which is managed by a usual operating system. By defining the use situation of the memory as the memory use rate, the use situation of the resources can be displayed on one graph whose vertical axis is "resource use rate (%)", as illustrated to FIG. 15B. Like the graph of FIG. 15A, the graph of FIG. 15B is useful to grasp the present situation of the computer system 1. It should be noted that the system control data generating tool 25 has a function to display the use situation of each of the resources in a plurality of measurement periods (for example, two the measurement periods of 10:00 to 10:05 and 10:05 to 10:10) every Web request. Specifically, by calculating the resource use rate in each measurement period and by averaging the calculated resource use rates, a graph can be displayed in the same way.

When the CPUs and the memories in the Web layer, the function layer, and the data layer have equivalent functions and capabilities, it is useful to calculate the use rate and the use amount of the resources of the whole computer system 1 are calculated every king of the Web request and every measurement period. In the present exemplary embodiment, the CPU use rate and memory use amount of the whole computer system 1 are calculated every kind of Web request kind and every measurement period. Specifically, when the length of all the measurement periods is constant, the CPU use rate $\psi_{Rj}(i)$ of the whole computer system 1 to the Web request of the kind "Rj" in the measurement period "i" is calculated from the following equation:

$$\psi_{Rj}(i) = N_{Rj}(i) \cdot U_{Rj} / \Delta t \quad (14a)$$

and when the length of the measurement period is variable, it is calculated from the following equation:

$$\psi_{Rj}(i) = N_{Rj}(i) \cdot U_{Rj} / \Delta t(i) \quad (14a')$$

Here, $U_{Rj}$ is a summation of the CPU times which one Web request of the kind "Rj" consumes in each of the Web layer, the function layer, and the data layer and is defined by the following equation:

$$U_{Rj} = U_{Rj}^W + U_{Rj}^F + U_{Rj}^D \quad (14b)$$

On the other hand, the memory use amount $\phi_{Rj}(i)$ of the whole computer system 1 of the Web request of the kind "Rj" in the measurement period "i" is the following equation:

$$\phi_{Rj}(i) = N_{Rj}(i) \cdot M_{Rj} \quad (15a)$$

Here, $M_{Rj}$ is a summation of the memory use amounts of one Web request of the kind "Rj" in each of the Web layer, the function layer, the data layer is calculated from the following equation:

$$M_{Rj}=M_{Rj}^{W}+M_{Rj}^{F}+M_{Rj}^{D} \quad (15b)$$

Moreover, the system control data generating tool 25 has a function to estimate a response time to the Web request when the load of the computer system 1 is comparatively light, every kind of Web request. The response time is an effective parameter to analyze the ability of the computer system 1. Specifically, the system control data generating tool 25 calculates the response time $T_{Rj}$ to the Web request of the kind "Rj" from the following equation:

$$T_{Rj}=U_{Rj}^{W}+U_{Rj}^{F}+U_{Rj}^{D} \quad (15c)$$

As described above, $U_{Rj}^{W}$, $U_{Rj}^{F}$, and $U_{Rj}^{D}$ are the CPU times which are necessary to process one Web request of the kind "Rj" in the Web layer, the function layer, and the data layer, respectively. A summation of the CPU times is substantially equal to the response time when the load is comparatively light. The calculated response time is stored in the storage unit 7b as response time data 43.

Generally, in order to obtain the response time when the load is comparatively light, it is necessary to prepare the experiment environment of an exclusive use and to perform an experiment. However, when the technique of the present exemplary embodiment is used, the response time can be measured even in an actual operational environment in which any request processing is always performed. Therefore, it is not necessary to prepare the experiment environment of the exclusive use.

The exemplary embodiments of the present invention have been described above. However, the present invention can be modified and is not limited to them. For example, in the above-mentioned exemplary embodiment, the kind of the Web request is defined by a method contained in the request but may be defined by a different matter. For example, the kind of the Web request may be defined by URL which is referred to as to the Web request.

Also, the computer system 1 is a server network with a 3-layer structure of the Web layer, the function layer, and the data layer in the present exemplary embodiment. However, the present invention can be applied to the computer system of a server network with a 2-layer structure or a structure of 4 layers or more. Also, the present invention can be applied to the computer system which does not have a hierarchy structure.

As described above, the exemplary embodiments of the present invention are described with reference to the attached drawings. However, the present invention is not limited to the above-mentioned embodiments and can be properly modified by a skilled person in the art without departing from the spirit of the present invention.

The invention claimed is:

1. A computer system comprising:
    a server network comprising at least a server; and
    a managing apparatus configured to collect information from said server network,
    wherein said managing apparatus comprises:
    a change parameter calculating section configured to calculate a request count change parameter indicating a change in the number of requests processed by said computer system from a request log in which the number of requests processed in each of measurement periods is described, and to calculate a resource change parameter indicating change in a use rate and/or a use amount of each of resources of said computer system from a system log in which a use state of said each resource of said computer system in said each measurement period is described; and
    an asynchronous process detecting section configured to detect occurrence of at least one of post processing and burst processing from said request count change parameter and said resource change parameter, wherein said post processing is processing performed after a response when said computer system processes each of the requests, and said burst processing is processing which is performed with no relation to the processing of the request but is the processing which is not performed ordinarily.

2. The computer system according to claim 1, wherein said server network further comprises:
    a load distribution apparatus configured to distribute load of said server in said server network, and
    said managing apparatus collects information from said load distribution apparatus in addition to said server network.

3. The computer system according to claim 1, wherein said managing apparatus further comprises:
    a determination table showing correspondence relation between said request count change parameter, said resource change parameter and the occurrence of said post processing and/or said burst processing, and
    said asynchronous processing detecting section detects the occurrence of said post processing and/or said burst processing by using said determination table.

4. The computer system according to claim 1, wherein said asynchronous processing detecting section of said managing apparatus judges said post processing to occur in a some period of said measurement periods when said request count change parameter indicates in said some period that the change in the number of processed requests is larger than a predetermined value, and said resource change parameter indicates in said some period that the change in the use rate and/or use amount of said each resource is within a predetermined range.

5. The computer system according to claim 1, wherein said asynchronous processing detecting section of said managing apparatus judges said post processing to occur in a some period of said measurement periods when said request count change parameter indicates in said some period that the change in the number of processed requests decreases and said resource change parameter indicates in said some period that the change in the use rate and/or use amount of said each resource is within a predetermined range.

6. The computer system according to claim 1, wherein said asynchronous processing detecting section of said managing apparatus judges said burst processing to occur in a some period of said measurement periods when said request count change parameter indicates in said some period that the change in the number of processed requests is within a predetermined range, and said resource change parameter indicates in said some period that the change in the use rate and/or use amount of said each resource is larger than a predetermined value.

7. The computer system according to claim 1, wherein said asynchronous processing detecting section of said managing apparatus judges said burst processing to occur in a some period of said measurement periods when said request count change parameters indicates in said some period that the change in the number of processed requests is within a predetermined range and said resource change parameter indicates in said some period that the use rate and/or use amount of said each resource increase.

8. The computer system according to claim 1, wherein said managing apparatus further comprises a system log generating section,
   wherein said the system log generating section generates said system log every layer of a plurality of servers, and
   said asynchronous processing detecting section calculates the occurrence of said post processing and/or said burst processing.

9. The computer system according to claim 1, wherein said managing apparatus further comprises:
   a request classifying section; and
   a resource use state calculating section,
   wherein said request is a Web request,
   said request classifying section generates request classification log which describes the number of Web requests processed by said computer system in said each measurement period every kind of said Web request from said request log, and
   said resource use state calculating section generates extraction system log generated by excluding measurement data of the use rate and/or use amount of said each resource in periods of the measurement periods in which the occurrence of said post processing and/or said burst processing is detected, from said system log, and calculates a request process resource use amount which is a use amount of said each resource used for processing one of said Web requests every kind of said Web request by using said request classification log and said extraction system log.

10. The computer system according to claim 1, wherein said managing apparatus further comprises:
    an upper limit setting section configured to set an upper limit of a use rate and/or use amount of a server resource of said computer system to a first value which is higher than a second value when the occurrence of said post processing and/or said burst processing is detected, and set the upper limit of the use rate and/or use amount of the server resource of said computer system to the second value when the occurrence of said post processing and/or said burst processing is not detected.

11. The computer system according to claim 9, wherein said managing apparatus further comprises:
    a fee data generating section configured to generate a fee data indicating a fee charged on a user by said request process resource use amount.

12. The computer system according to claim 9, wherein said managing apparatus further comprises:
    a system control data generating section configured to calculate the use state of said each resource every kind of said Web request every said measurement period from said request process resource use amount, and to display the calculated use state of said each resource in graph.

13. A managing apparatus comprising:
    a change parameter calculating section, stored in a memory, and configured to calculate a request count change parameter indicating a change in the number of requests processed by a computer system from a request log in which the number of requests processed in each of measurement periods is described, and to calculate a resource change parameter indicating change in a use rate and/or a use amount of each of resources of said computer system from a system log in which a use state of said each resource of said computer system in said each measurement period is described; and
    an asynchronous process detecting section, stored in the memory, and configured to detect occurrence of at least one of post processing and burst processing from said request count change parameter and said resource change parameter, wherein said post processing is processing performed after a response when said computer system processes each of the requests, and said burst processing is processing which is performed with no relation to the processing of the request but is the processing which is not performed ordinarily.

14. A computer system managing method of managing a computer system which processes requests, comprising:
    calculating a request count change parameter indicating a change in the number of requests processed by said computer system and a resource change parameter indicating change in a use rate and/or a use amount of each of resources of said computer system from a request log in which the number of requests processed in each of measurement periods is described, and a system log in which a use state of said each resource of said computer system in said each measurement period is described; and
    detecting occurrence of at least one of post processing and burst processing from said request count change parameter and said resource change parameter, wherein said post processing is processing performed after a response when said computer system processes each of the requests, and said burst processing is processing which is performed with no relation to the processing of the request but is the processing which is not performed ordinarily.

15. The computer system managing method according to claim 14, further comprising:
    setting an upper limit of a use rate and/or use amount of a server resource of said computer system to a first value which is higher than a second value when the occurrence of said post processing and/or said burst processing is detected; and
    setting the upper limit of the use rate and/or use amount of the server resource of said computer system to the second value when the occurrence of said post processing and/or said burst processing is not detected.

16. A non-transitory computer-readable recording medium in which a computer-executable program code is recorded to realize a computer system managing method of managing a computer system which processes requests, wherein said computer system managing method comprising:
    calculating a request count change parameter indicating a change in the number of requests processed by said computer system and a resource change parameter indicating change in a use rate and/or a use amount of each of resources of said computer system from a request log in which the number of requests processed in each of measurement periods is described, and a system log in which a use state of said each resource of said computer system in said each measurement period is described; and
    detecting occurrence of at least one of post processing and burst processing from said request count change parameter and said resource change parameter, wherein said post processing is processing performed after a response when said computer system processes each of the requests, and said burst processing is processing which is performed with no relation to the processing of the request but is the processing which is not performed ordinarily.

* * * * *